(12) United States Patent
Sudoh et al.

(10) Patent No.: US 12,517,361 B2
(45) Date of Patent: Jan. 6, 2026

(54) OPTICAL SYSTEM, VIRTUAL IMAGE DISPLAY DEVICE, AND HEAD-MOUNTED DISPLAY

(71) Applicants: Yoshifumi Sudoh, Kanagawa (JP); Takemasa Tsutsui, Kanagawa (JP)

(72) Inventors: Yoshifumi Sudoh, Kanagawa (JP); Takemasa Tsutsui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 306 days.

(21) Appl. No.: 18/376,851

(22) Filed: Oct. 5, 2023

(65) Prior Publication Data

US 2024/0118549 A1 Apr. 11, 2024

(30) Foreign Application Priority Data

Oct. 5, 2022 (JP) .................. 2022-160726

(51) Int. Cl.
 *G02B 27/01* (2006.01)
 *G02B 27/09* (2006.01)

(52) U.S. Cl.
 CPC .......... *G02B 27/0172* (2013.01); *G02B 2027/0178* (2013.01); *G02B 27/0911* (2013.01)

(58) Field of Classification Search
 CPC ................................................ G02B 27/0172
 See application file for complete search history.

(56) References Cited

U.S. PATENT DOCUMENTS

| | | | |
|---|---|---|---|
| 2016/0278695 A1* | 9/2016 | Wang | A61B 34/25 |
| 2019/0278086 A1 | 9/2019 | Ofir | |
| 2021/0165221 A1 | 6/2021 | Hasegawa et al. | |
| 2022/0026716 A1 | 1/2022 | Sudoh et al. | |
| 2022/0057640 A1 | 2/2022 | Nakamura et al. | |
| 2023/0003931 A1 | 1/2023 | Nakamura et al. | |
| 2023/0039870 A1 | 2/2023 | Momma et al. | |
| 2023/0088184 A1 | 3/2023 | Sudoh | |
| 2023/0100029 A1 | 3/2023 | Tsutsui | |
| 2023/0266595 A1 | 8/2023 | Sudoh | |

FOREIGN PATENT DOCUMENTS

| | | |
|---|---|---|
| JP | 2021-086052 A | 6/2021 |
| JP | 2021-086141 A | 6/2021 |
| JP | 2021-149006 A | 9/2021 |
| JP | 2022-024648 A | 2/2022 |
| JP | 2022-190206 A | 12/2022 |
| JP | 2023-003775 A | 1/2023 |
| JP | 2023-121413 A | 8/2023 |

* cited by examiner

*Primary Examiner* — Edmond C Lau
(74) *Attorney, Agent, or Firm* — XSENSUS LLP

(57) ABSTRACT

An optical system includes: a light guide to guide image light; a partial reflector; and a reflector. The partial reflector transmits a first image light guided in a first direction from a first side of the partial reflector in a light guide; and reflects second image light to exit outside from a light emission surface of the light guide, the second image light being guided in the light guide in a second direction opposite to the first direction from a second side of the partial reflector. The reflector at the second side of the partial reflector reflects the first image light back to the partial reflector as the second image light in the second direction. A dimension of the light guide in a thickness direction is longer than a beam diameter of the image light guided in the light guide. The light emission surface has a negative power.

12 Claims, 28 Drawing Sheets

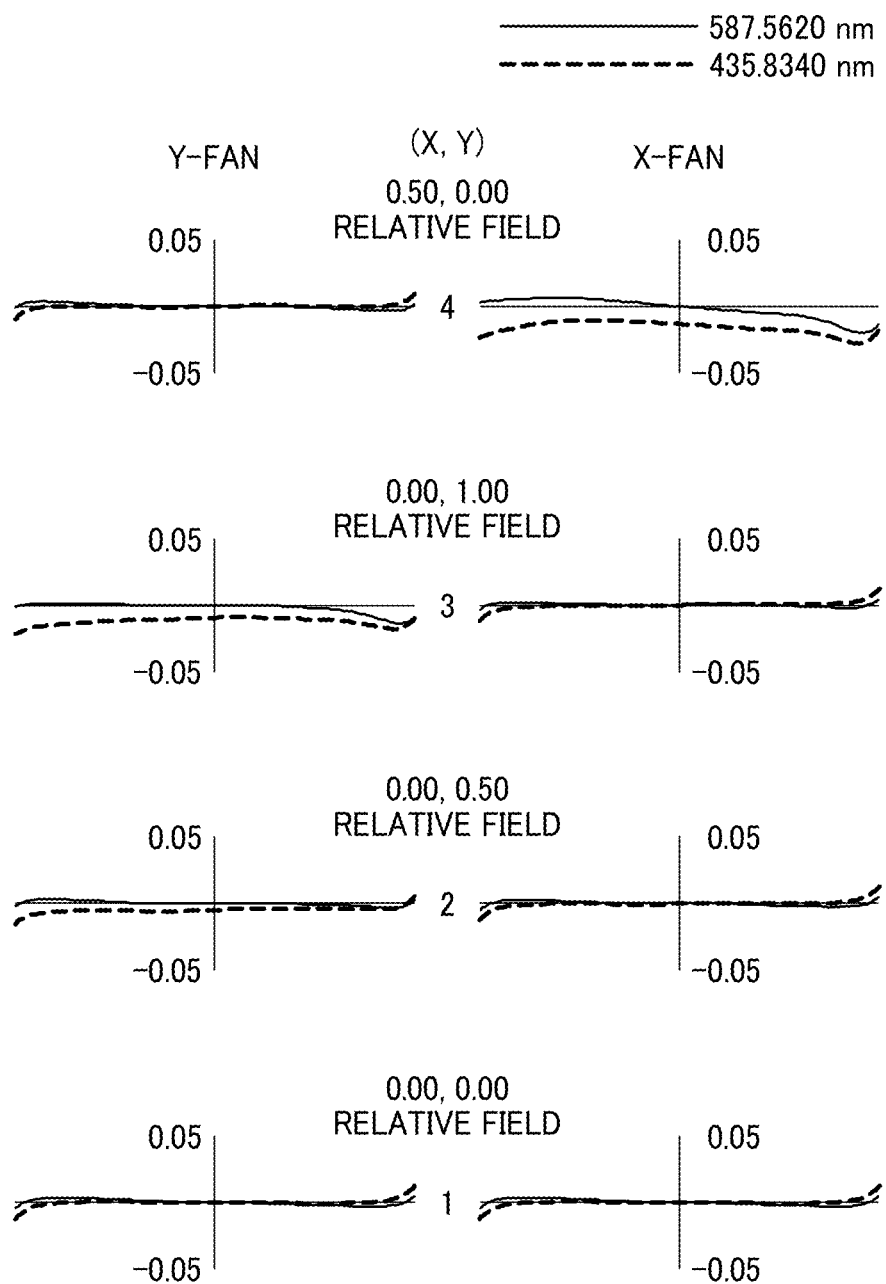

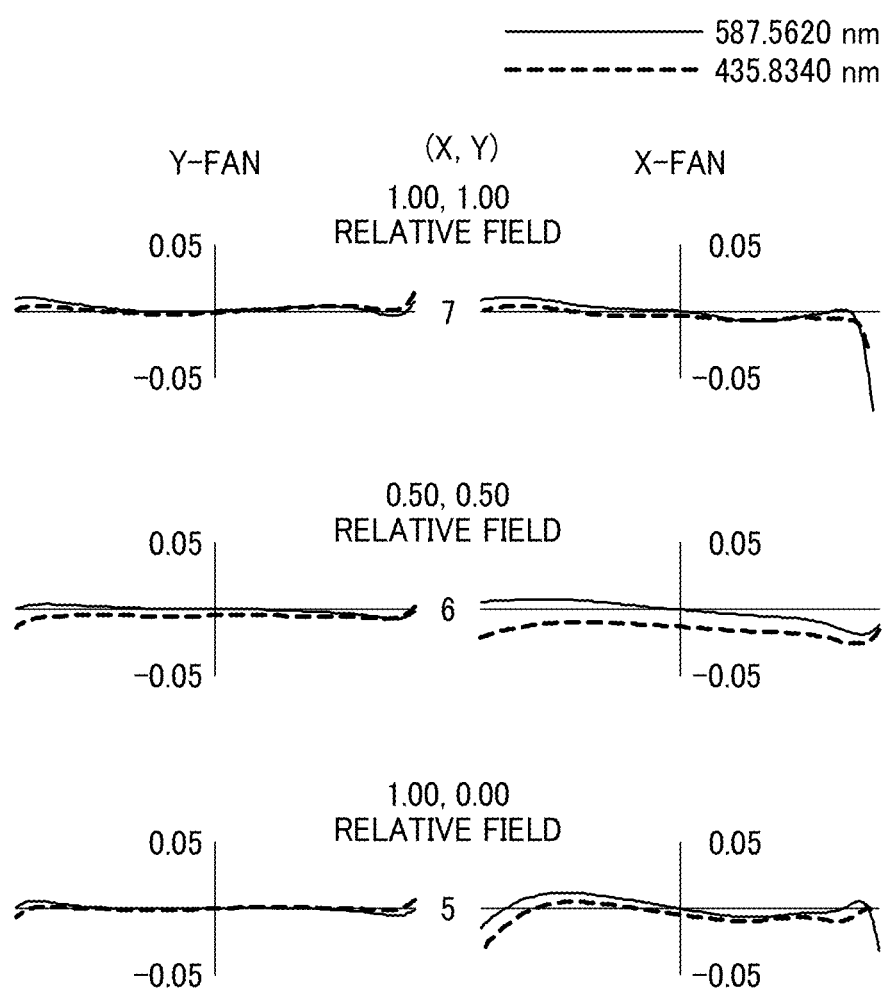

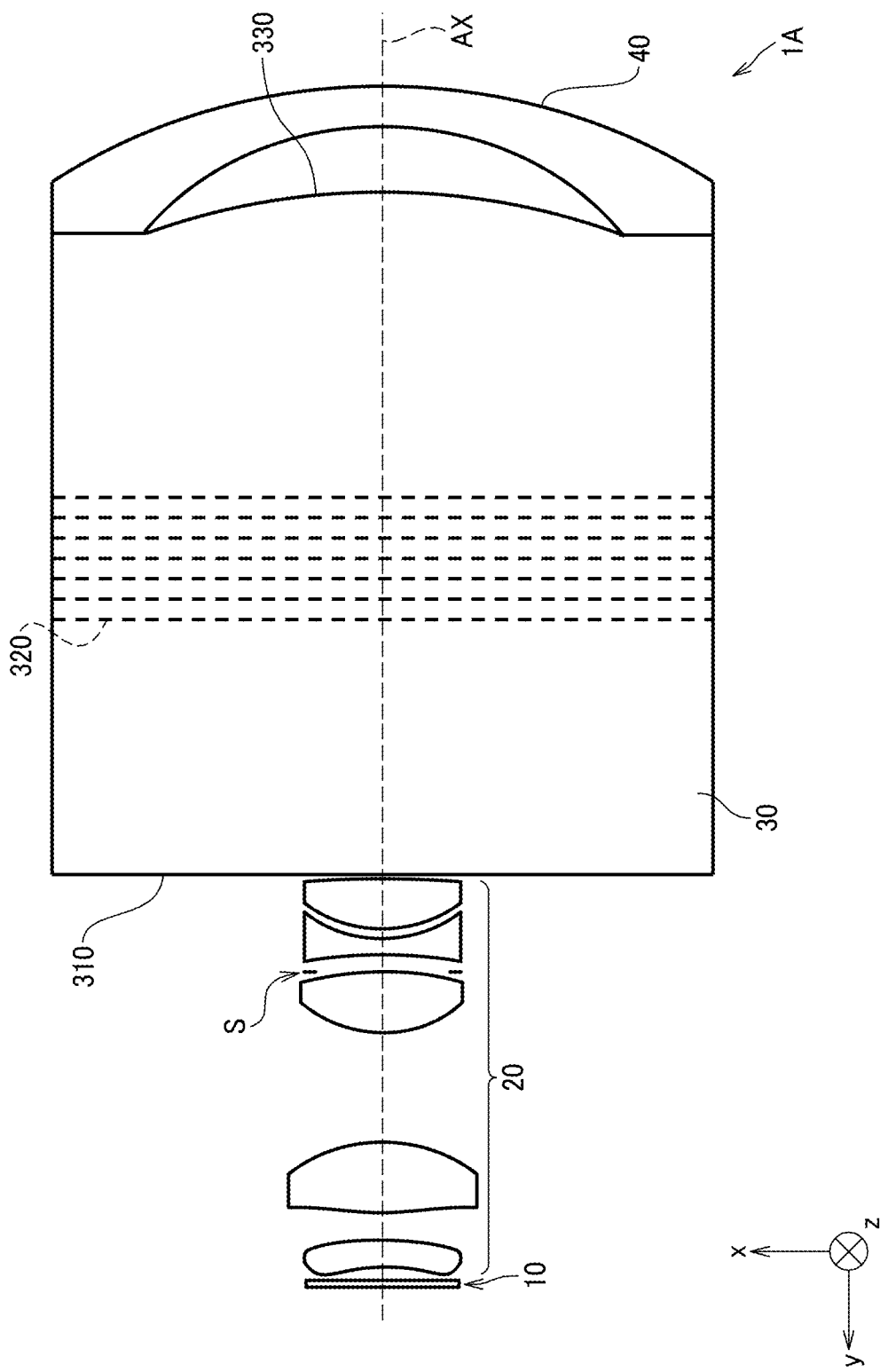

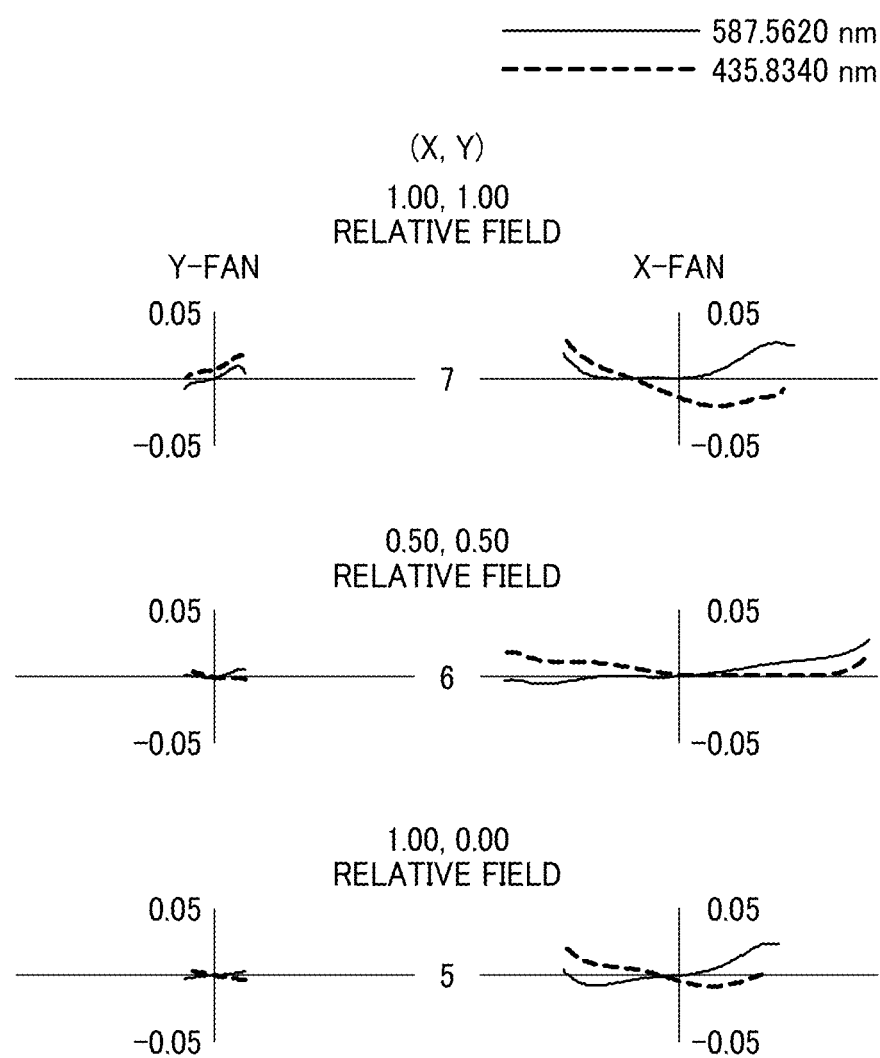

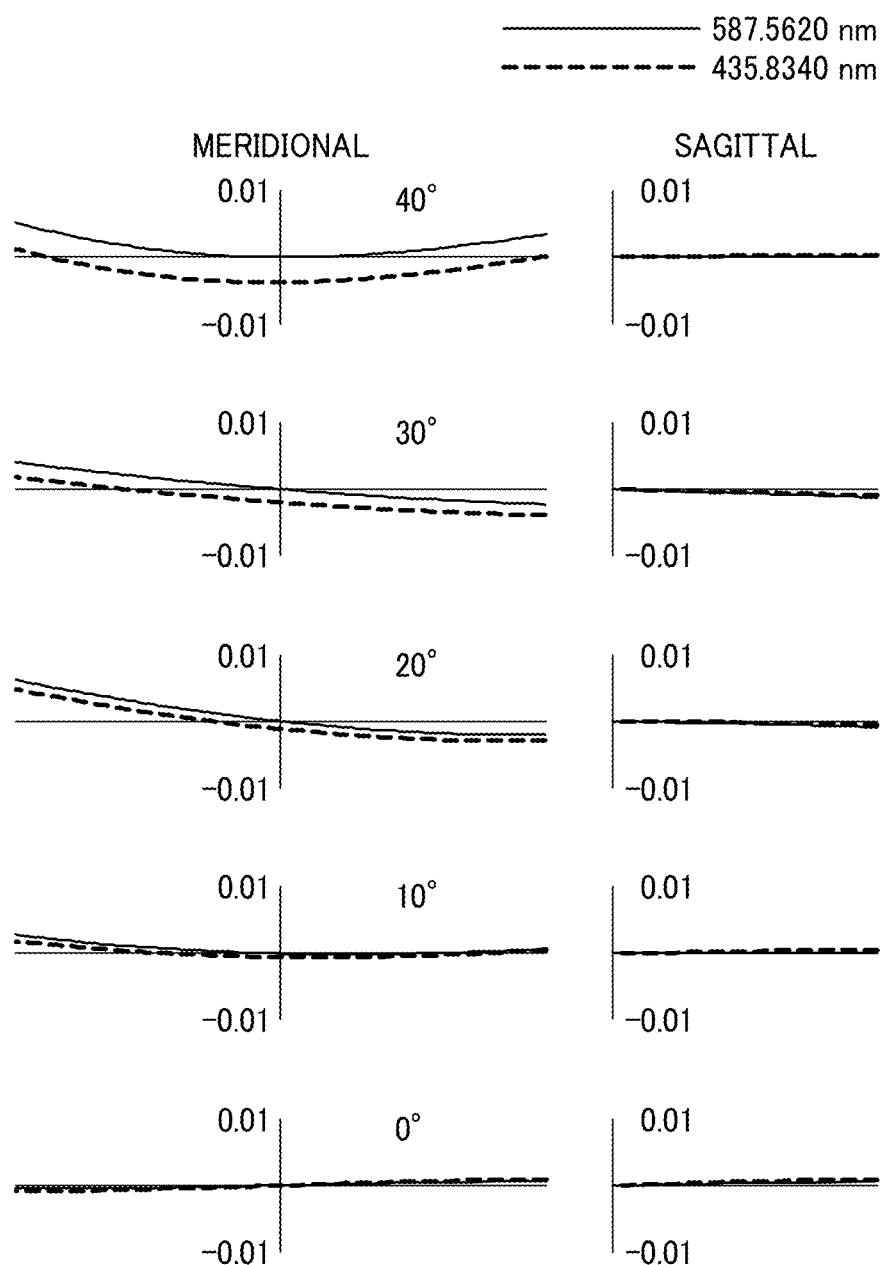

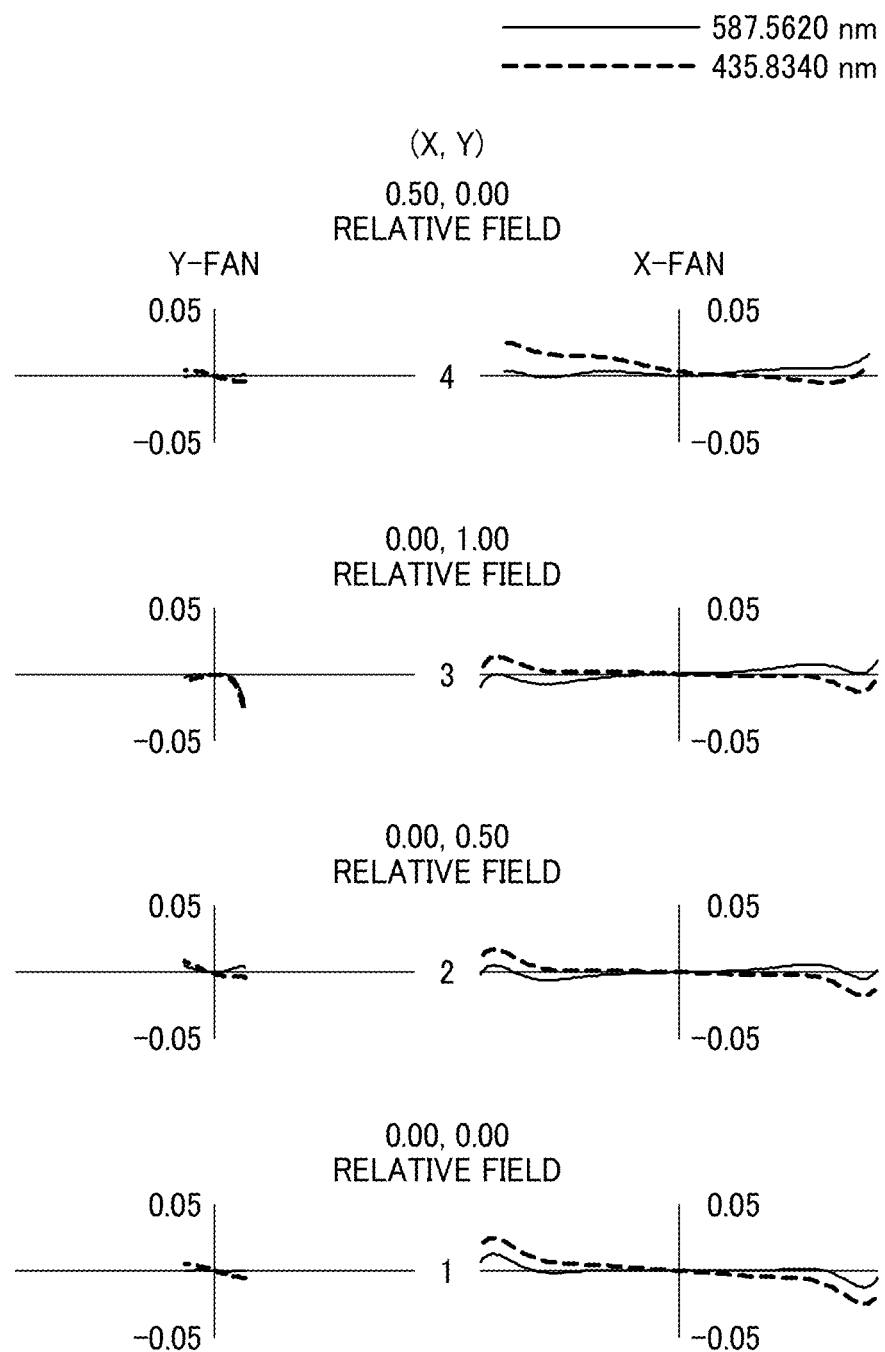

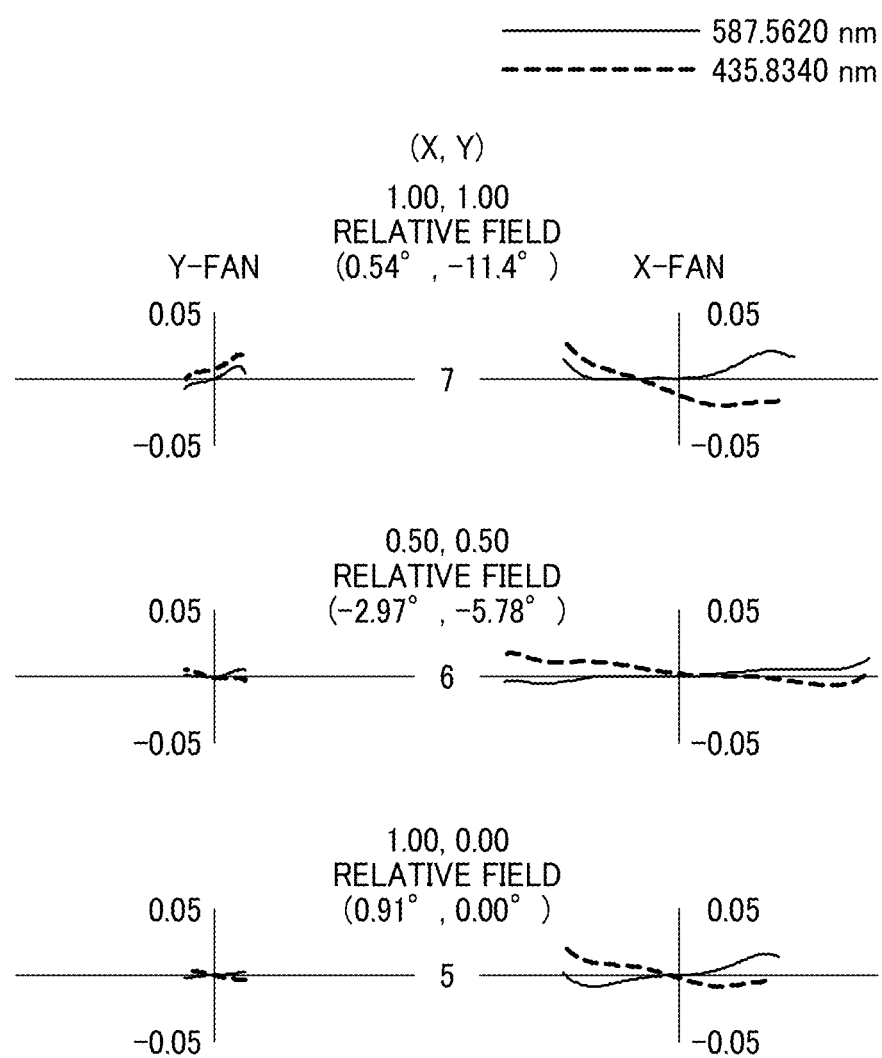

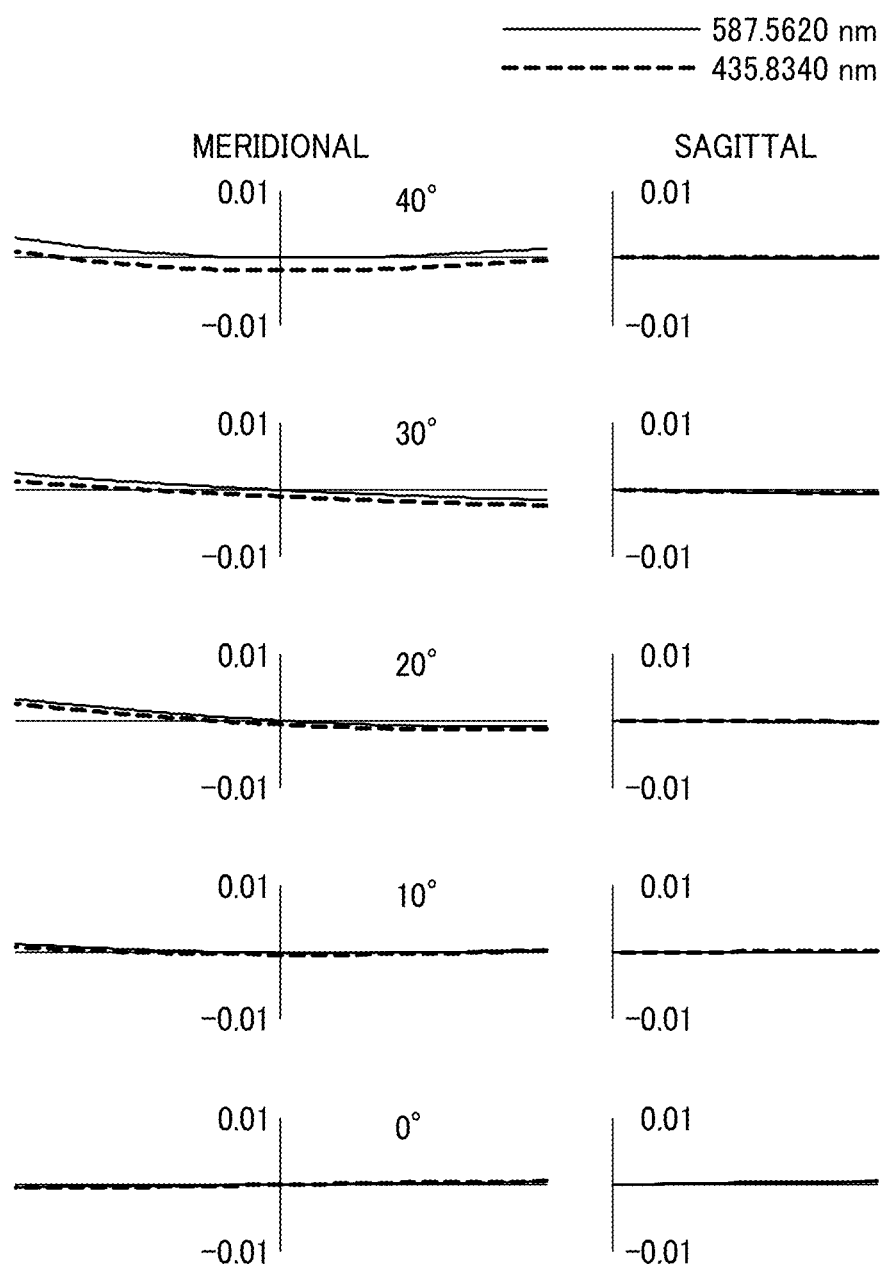

PLEASE CUT IN ORDER

OPTICAL SYSTEM, VIRTUAL IMAGE DISPLAY DEVICE, AND HEAD-MOUNTED DISPLAY

CROSS-REFERENCE TO RELATED APPLICATIONS

This patent application is based on and claims priority pursuant to 35 U.S.C. § 119(a) to Japanese Patent Application No. 2022-160726, filed on Oct. 5, 2022, in the Japan Patent Office, the entire disclosure of which is hereby incorporated by reference herein.

BACKGROUND

Technical Field

Embodiments of the present disclosure relate to an optical system, a virtual image display device, and a head-mounted display.

Related Art

Virtual image display devices have been developed for displaying an enlarged two-dimensional virtual image to an observer.

A typical virtual image display device, for example, allows light (i.e., image light, or light containing image information) emitted from the image display element to proceed through a lens and emits the image light toward an observer, or a user. This allows the observer to observe an enlarged virtual image formed with the emitted image light.

SUMMARY

An embodiment of the present disclosure provides an optical system including a light guide to guide image light emitted from an image display element that displays an image; a partial reflector; and a reflector. The partial reflector transmits a first image light guided in a first direction from a first side of the partial reflector in a light guide; and reflects second image light to exit outside the light guide from a light emission surface of the light guide, the second image light guided in the light guide in a second direction opposite to the first direction from a second side different from the first side of the partial reflector. The reflector at the second side of the partial reflector to reflects the first image light, transmitted through the partial reflector in the first direction, back to the partial reflector as the second image light in the second direction. A dimension of the light guide in a thickness direction is longer than a beam diameter of the image light guided in the light guide, the thickness direction being defined by a distance between the light emission surface and an opposing surface of the light guide opposed to the light emission surface. The light emission surface has a negative power.

An embodiment of the present disclosure provides a virtual image display device including the optical system described above; and the image display element.

An embodiment of the present disclosure provides a head-mounted display comprising the virtual image display device described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9A illustrates lateral aberration diagrams when image light passes through the optical system for a virtual image display device according to Numerical Example 1 of the present disclosure;

FIG. 9B illustrates lateral aberration diagrams when image light passes through the optical system for a virtual image display device according to Numerical Example 1 of the present disclosure;

FIG. 14B is another diagram illustrating the optical configuration of the virtual image display device according to Numerical Example 3;

FIG. 15B illustrates lateral aberration diagrams when image light passes through the optical system for a virtual image display device according to Numerical Example 3 of the present disclosure;

FIG. 16 illustrates lateral aberration diagrams when light from an object at infinity passes through a light guide according to Numerical Example 3 of the present disclosure;

FIG. 20A illustrates lateral aberration diagrams when image light passes through the optical system for a virtual image display device according to Numerical Example 5 of the present disclosure;

FIG. 20B illustrates lateral aberration diagrams when image light passes through the optical system for a virtual image display device according to Numerical Example 5 of the present disclosure;

FIG. 21 illustrates lateral aberration diagrams when light from an object at infinity passes through a light guide according to Numerical Example 5 of the present disclosure;

Figure 1:
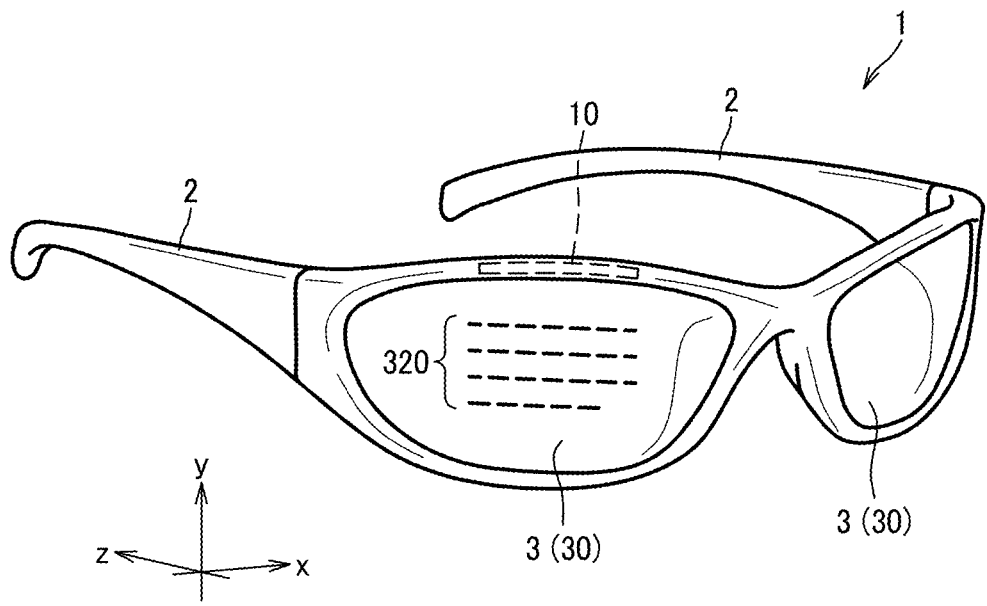
FIG. 1 is a schematic diagram of a head-mounted display incorporating a virtual display device according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A typical virtual image display device has a concave lens fitted to a glass lens portion, positioned in front of the observer's eyes, to set the appropriate virtual image distance.

In the typical virtual display device, a clearance is provided between the glass lens and the concave lens to satisfy the conditions for total reflection and allow the image light to be guided in the glass lens while undergoing total reflection. This arrangement necessitates a separate component to support the concave lens, as the concave lens cannot be directly attached to the glass lens.

Embodiments of the present disclosure provide an optical system for a virtual image device, which allows setting of an appropriate distance to a virtual image, a virtual image display device incorporating the optical system, and a head-mounted display incorporating the optical system.

An optical system for a virtual image display device according to an embodiment, a virtual image display device, and a head-mounted display are described below with reference to the drawings. In the drawings, like reference signs denote like elements, and overlapping description may be simplified or omitted as appropriate.

FIG. 1 is a schematic diagram of a head-mounted display 1 incorporating a virtual display device according to an embodiment of the present disclosure. In the present embodiment, a head-mounted display 1 is, for example, smartglasses that serve as a glasses-type wearable terminal. The smartglasses may be referred to as a glass device or a glass display.

Examples of the head-mounted display 1 include a virtual reality (VR) glasses, augmented reality (AR) Glasses, mixed reality (MR) Glasses, extended reality (XR) glasses, which are all wearable terminals.

In FIG. 1, the head-mounted display 1 is a binocular head-mounted display. In another embodiment, the head-mounted display 1 may be a monocular head-mounted display corresponding to one of the left and right eyes.

As illustrated in FIG. 1, the head-mounted display 1 includes a frame portion 2 and a lens portion 3. The lens portion 3 is fitted into the frame portion 2. A pair of lens portions 3 is disposed corresponding to the left and right eyes of the wearer.

An image display element 10 for displaying an image is built in the frame portion 2. In FIG. 1, the image display element 10 is embedded in a portion of the frame portion 2 covering the upper edge of the lens portion 3. The installation position of the image display element 10 is not limited to the position illustrated in FIG. 1. Alternatively, the image display element 10 may be embedded in a portion of the frame portion 2 covering the lower edge of the lens portion 3.

The image display element 10 displays an image to be recognized as a virtual image. Examples of the image display element 10 include an organic light emitting diode (OLED) array, a laser diode (LD) array, a light emitting diode (LED) array, micro electro mechanical systems (MEMS), and a digital micromirror device (DMD).

In the following description, a z-direction in FIG. 1 is referred to as a first horizontal direction from the lens portion 3 to the eyes of the wearer (a user), an x-direction in FIG. 1 is referred to as a second horizontal direction orthogonal to the z-direction, and a y-direction in FIG. 1 is referred to as a vertical direction orthogonal to each of the x-direction and the z-direction. The x-direction, the y-direction, and the z-direction orthogonal to each other form a left-handed system.

The term "direction" is used for convenience to describe the relative position between the components, and does not indicate an absolute direction. Depending on the posture of the user wearing the head-mounted display 1, for example, the z-direction may not be the horizontal direction and may be the vertical direction.

Light rays (i.e., image light) emitted from the respective pixels of the image display element 10 are emitted from the image display element 10 in the −y-direction to enter the lens portions 3 and proceed through the lens portions 3. Thereafter, the light rays are emitted from the lens portions 3 in the +z-direction (i.e., to the eyes of the wearer) for display of a virtual image. In other words, the pair of lens portions 3 each forms an eye box in a region including the corresponding eye.

Figure 2:
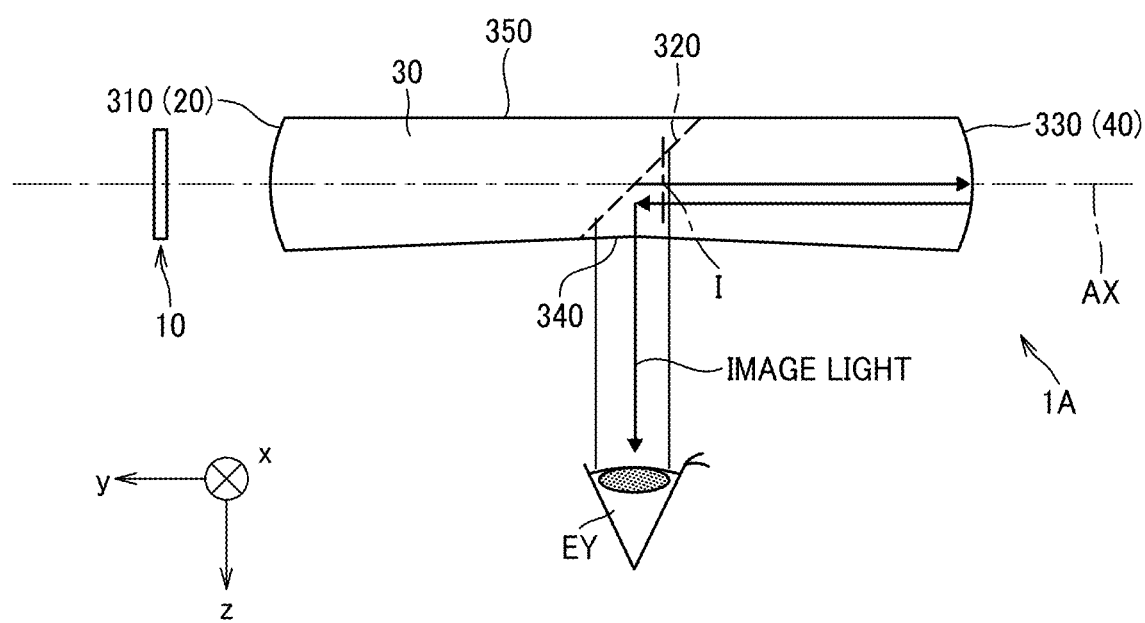
FIG. 2 is a schematic diagram of a virtual image display device according to an embodiment of the present disclosure.

FIG. 2 is a schematic diagram of a virtual image display device 1A according to an embodiment of the present disclosure. FIG. 2 is an illustration of a yz cross-sectional plane (a cross-sectional plane including the optical axis AX) of the image display element 10 and one lens portion 3.

In the present embodiment, the optical axis AX is defined as an optical path of light proceeding from the center of the effective pixel area of the image display element 10 in a direction perpendicular to the pixel array surface. The optical axis AX is also an optical axis of the virtual image display device 1A, and is also an optical axis of each of optical components (for example, the light guide 30) included in the optical system for the virtual image display device 1A.

The virtual image display device 1A is, for example, mounted on the head-mounted display 1.

The virtual image display device 1A according to the present embodiment may be mounted on a device of other forms other than a head-mounted display. For example, the virtual image display device 1A may be mounted on a head-up display.

The virtual image display device 1A includes an image display element 10 and an optical system for the virtual image display device. In the schematic diagram of FIG. 2, the virtual image display device 1A includes an image display element 10 and a light guide 30. In FIG. 2, the left or right eye EY of the wearer is illustrated.

As will be described in detail later, the intermediate image I is formed in the light guide 30. An optical portion positioned in front of the intermediate image I (referred to as a "front optical portion" for convenience) includes an anamorphic surface in which a magnification in a third direction is different from a magnification in a fourth direction different from the third direction.

The light guide 30 is an optical component that guides image light from the image display element 10. In the virtual image display device 1A mounted on the head-mounted display 1, the lens portion 3 corresponds to the light guide 30.

The light guide 30 has a first face 310 (incident surface) on which the image light from the image display element 10 strikes. In FIG. 2, the first face 310 is an anamorphic surface included in the front optical portion.

The intermediate image I of the image light is formed in the light guide 30 by the first face 310 having anamorphic power included in the front optical portion. The intermediate image I has the first magnification in the third direction (i.e., the z-direction in the present embodiment) and the second magnification in the fourth direction (i.e., the x-direction in the present embodiment).

Among the absolute values of the magnifications of the intermediate image I, the absolute value of the first magnification in the z-direction (the third direction) is minimum, and the absolute value of the second magnification in the x-direction (the fourth direction) is maximum. In other words, the size of the intermediate image I formed in the light guide 30 is minimum in the z-direction and maximum in the x-direction.

In the virtual image display device 1A mounted on the head-mounted display 1, the light guide 30 defining the lens portion 3 has a thickness direction in the z-direction (the third direction). In this configuration, the light guide 30 is formed to be thinnest in the third direction. In the present embodiment, the size of the intermediate image I formed in the light guide 30 is reduced in the z-direction. This achieves a reduction in the thickness of the light guide 30.

In the light guide 30, a partial reflector 320 is disposed to split the image light entered through the first face 310 of the light guide 30, into reflected light and transmitted light. The partial reflector 320 has a partial reflection surface having, for example, a reflectance and transmittance of at least 5% or greater.

The partial reflector 320 transmits a part (some rays) of image light guided in the −y-direction within the light guide 30 (i.e., the first-direction image light, which is directed in a first direction from the first area where the image display element 10 is positioned). The partial reflector 320 reflects, in the +z-direction, a part (some rays) of image light guided in the +y-direction within the light guide 30 (i.e., the second-direction image light, which is directed in a second direction from the second area that is different from the first area within the light guide 30). Thus, the image light is caused to exit externally through the third face 340 (light emission surface) of the light guide 30.

For example, multiple partial reflectors 320 are disposed at predetermined intervals along the optical axis AX in the light guide 30.

In this configuration, multiple partial reflectors 320 split the image light into multiple light beams. This enables a wide eye box and a wide angle of view irrespective of using a thinner light guide 30. This allows the wearer to visually identify or perceive the virtual image easily and also a virtual image with a wide angle of view, irrespective of the movement of the eye EY relative to the virtual image display device 1A.

With the partial reflectors 320 spaced too closely, for example, non-uniformity in light amount (or non-uniformity in the luminance of a virtual image) is more likely to occur because image light that has reflected off a first partial reflector 320 further reflects off a second partial reflector 320 adjacent to the first partial reflector 320. The numerous partial reflectors 320 may more likely interfere with the wearer's field of view, potentially obstructing, for instance, the wearer's view of the external scenery. By contrast, with the partial reflectors 320 spaced too widely, for example, the virtual image appears partially missing depending on a location within the eye box. In view of such circumstances, the partial reflectors 320 are preferably spaced with appropriate intervals.

The interval may be equal or may not be equal between adjacent partial reflectors of the multiple partial reflectors 320.

The partial reflector 320 is oriented to allow the image light to form a predetermined angle (e.g., an angle of 45 degrees) relative to the y-direction. The partial reflector 320 is, for example, a semi-reflective mirror. The partial reflector 320 may be a polarizing beam splitter (PBS).

The partial reflector 320 includes, for example, a partial reflection surface formed in a plane. Such a configuration with the partial reflector 320 formed in a plane increases the ease of manufacture.

In a case in which the light guide 30 includes multiple partial reflectors 320 each having a non-flat surface (e.g., a surface having a curvature), the following issues are raised. In this configuration, adjacent partial reflectors 320 are formed in different shapes to display a high-resolution virtual image with aberrations successfully corrected. In order to correct aberrations successfully, the aberration correction is shared by the partial reflectors 320 and an optical system (one or more optical components) closer to the image display element 10 than the partial reflectors 320 along the optical path of the image light. To achieve such a performance, each of the multiple partial reflectors 320 has a shape with a different free-form surface. This structure makes it difficult to obtain ease of manufacture and to correct aberrations.

In FIG. 2, the light guide 30 includes multiple optical blocks (a first optical block and a second block). The first optical block has a partial reflection surface (i.e., a partial reflector 320) formed on its inclined surface. The inclined surface on which the partial reflection surface is formed in the first optical block is bonded to the inclined surface of the second optical block (on which the partial reflection surface is not formed) to form the light guide 30.

Each of the partial reflection surfaces is composed of a deposited film formed by depositing a metal material, for example. To increase the degree of adhesion between the optical blocks, a primer layer may be formed on the inclined surface of the optical block before forming the partial reflection surface on the primer layer.

Each optical block of the light guide 30 is a molded product made of synthetic resin such as plastic. The light guide 30 made of such resin is lightweight. With a decrease in the weight of the light guide 30, the load on the nose of the wearer (the user) decreases. For this reason, the wearer can continue wearing the head-mounted display 1 for a long time without getting fatigued.

The light guide 30 may be made of glass.

As described in Numerical Examples 1 to 5, the virtual image display device 1A may include an aperture stop S. The aperture stop S is disposed on the optical path between the image display element 10 and the partial reflector 320 (for example, between the image display element 10 and the light guide 30). The aperture stop S substantially narrows the image light from the image display element 10 into an aberration-corrected image light. From another point of view, unnecessary light whose aberration is not corrected can be cut by the aperture stop S. This reduces the occurrence of flare and enables a higher image quality.

Further, the aperture stop S with an appropriately set size allows a depth of field sufficient to achieve the intended performance and enables higher resolution.

The shape of the aperture stop S may be circular or rectangular, and multiple aperture stops S may be arranged in a direction perpendicular to the optical axis AX. Such multiple small apertures provide an eye box and allow a virtual image with a wide depth of field.

In the present embodiment, the dimensions (dimensions in the x-direction and the z-direction) of the light guide 30 are larger than the beam diameter of the image light guided in the light guide 30 to allow the image light to be guided in the light guide 30 without being totally reflected in the light guide 30. In the optical configuration of the virtual image display device 1A, the beam diameter of the image light guided along the optical axis AX falls within the light guide 30.

To allow the beam diameter of the image light guided along the optical axis AX to fall within the light guide 30, the virtual image display device 1A includes an intermediate image former 20. The intermediate image former 20 forms an intermediate image I of the image light from the image display element 10 in the light guide 30.

The image light emitted from the image display element 10 and passed through the intermediate image former 20 is guided in the −y-direction (i.e., along the optical axis AX) within the light guide 30 while reducing its beam diameter. Then, the image light forms an intermediate image I near the partial reflector 320, proceeding to a reflector 40 to be described below. The image light, having a beam diameter that falls within the light guide 30, is guided in the light guide 30. This allows the image light to proceed to the reflector 40 without undergoing total reflection.

In FIG. 2, the first face 310 of the light guide 30 is formed as a spherical surface or an aspherical surface, which forms an intermediate image former 20 that forms the intermediate image I of the image light from the image display element 10 in the light guide 30 (for example, in the vicinity of the partial reflector 320). The first face 310 serving also as the intermediate image former 20 enables a smaller virtual image display device 1A and lower manufacturing cost.

Alternatively, the virtual image display device 1A may include a propagation optical system on the optical path of the image light traveling from the image display element 10 to the light guide 30. The propagation optical system directs the image light from the image display element 10 to the light guide 30 as detailed in Numerical Example 1 to Numerical Example 5 below. In this case, for example, the propagation optical system serves as the intermediate image former 20. This allows the propagation optical system to correct aberrations, enabling successful correction of various types of aberrations.

The propagation optical system 20 may include an anamorphic surface in which the magnification (first magnification) in the third direction and the magnification (second magnification) in the fourth direction are different from each other. In this case, the propagation optical system 20 forms the intermediate image I of the image light in the light guide 30 at the first magnification in the third direction and the second magnification in the fourth direction.

The virtual image display device 1A includes a reflector 40. The reflector 40 is at one side (a second side, or the opposite side of a first side of the partial reflectors 320 in FIG. 2) of the partial reflector 320, which is different from another side (the first side of the partial reflector 320, at which the image display element 10 is positioned in FIG. 2). In the virtual image display device 1A mounted on the head-mounted display 1, the reflector 40 is positioned at a lower frame portion below the lens portion 3, facing the image display element 10 in an upper frame portion above the lens portion 3.

The image light entered through the first face 310 and transmitted through the partial reflector 320 is guided to the reflector 40. The reflector 40 has a reflecting surface. The image light guided to the reflector 40 is reflected by the reflecting surface of the reflector 40 toward the partial reflector 320 in the z-direction.

The reflector 40 reflects the first-direction image light (i.e., image light guided in the −y-direction) transmitted through the partial reflector 320 as the second-direction image light (i.e., image light guided in the +y-direction) toward the partial reflector 320.

The light guide 30 includes a second face 330, which is opposite to the first surface with the partial reflector 320 between the first face 310 and the second face 330. In FIG. 2, the second face 330 is a reflecting surface serving as the reflector 40. The second face 330 serving as the reflector 40 enables a smaller virtual image display device 1A and lower manufacturing cost.

An optical portion positioned behind the intermediate image I (referred to as a "rear optical portion" for convenience) includes an anamorphic surface in which the magnification in the third direction is different from the magnification in the fourth direction. In FIG. 2, the second face 330 of the light guide 30, serving as the reflector 40, is an anamorphic surface. The second face 330 as an anamorphic surface has power for returning the aspect ratio of the image formed by the image display element 10, which has been changed by the anamorphic power of the first face 310, to the original aspect ratio. Thus, the wearer can visually recognize a virtual image having an appropriate aspect ratio.

The reflector 40 (i.e., the second face 330 serving as the reflecting surface of the light guide 30 in FIG. 2) has a positive power. The reflector 40 converts the image light incident through the partial reflector 320 into collimated light, reflecting the collimated light toward the partial reflector 320. As a result, the collimated light is guided to proceed in the +y-direction in the light guide 30, reflecting off the partial reflector 320 in the +z-direction. Thus, the reflected light exits externally through the third face 340 of the light guide 30, reaching the eyes EY of the wearer.

The collimated light may include substantially collimated light (light that diverges very slightly or light that converges very slightly).

The virtual image display device 1A may include another optical component separate from the light guide 30 in the optical path of the image light subsequent to the light guide 30 as detailed in Numerical Examples 1 to 3 below. In this case, for example, said another optical component serves as the reflector 40 including the reflecting surface.

The reflector 40 converts the image light transmitted through the partial reflector 320 and emitted from the second face 330 of the light guide 30 into collimated light, reflecting the collimated light toward the partial reflector 320. As a result, the collimated light is incident into the light guide 30 from the second face 330 and guided in the +y-direction, reflecting off the partial reflector 320 in the +z-direction. Then, the reflected light exits the light guide 30 through the third face 340, reaching the eye EY of the wearer.

This configuration causes the reflector 40 that is another optical component separate from the light guide 30 to correct aberrations and thus allows successful correction of various aberrations.

As described above, the reflector 40 converts the image light into collimated light, allowing the image light to be guided in the +y-direction (i.e., along the optical axis AX) while maintaining the beam diameter that falls within the bounds of the light guide 30, until the image light reaches the partial reflector 320. In this case, the image light proceeds to the partial reflector 320 without undergoing total reflection.

In the virtual image display device 1A according to the present embodiment, the intermediate image former 20 forms the intermediate image I with the image light emitted from the image display element 10 in the light guide 30 as described above. This reduces the thickness of the light guide 30 (in other words, the size of the light guide 30 is reduced in the z-direction). The reduction in the thickness of the light guide 30 enables a lightweight light guide 30. With a decrease in the weight of the light guide 30, the load on the nose of the wearer (the user) decreases. For this reason, the wearer can continue wearing the head-mounted display 1 for a long time without getting fatigued.

Further, forming an intermediate image I with the image light emitted from the image display element 10 in the light guide 30 allows the pupil of the optical system for the virtual image display device to be in the vicinity of the eye EY of the wearer. This allows for a wider eye box as well as a wider angle of view.

Figure 3A:
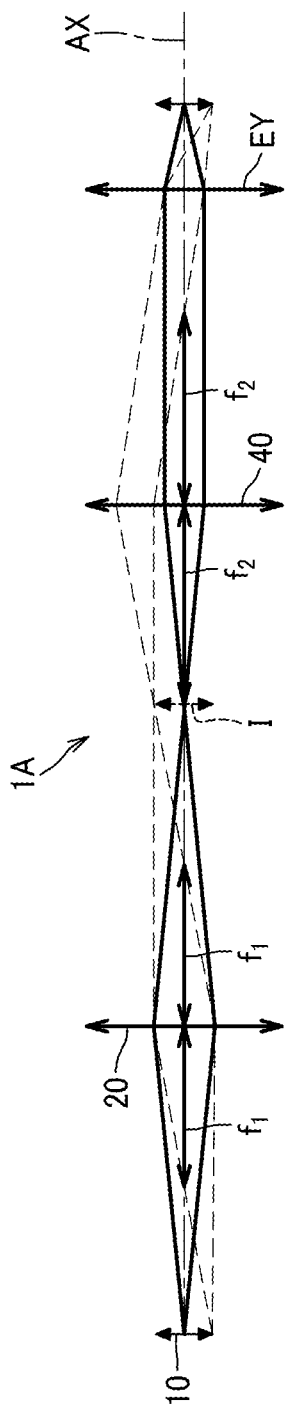
FIG. 3A, FIG. 3B, and FIG. 3C are ray diagrams each illustrating the reason why the thickness of a light guided can be reduced by forming, within the light guide, an intermediate image with image light from an image display element, according to an embodiment of the present disclosure.
Figure 3B:
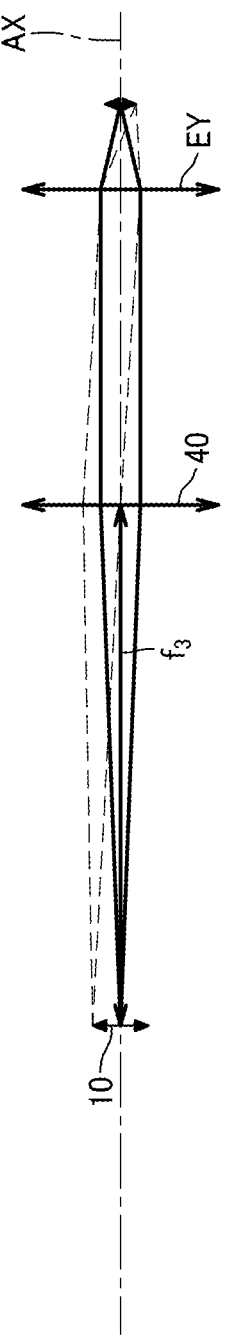
Figure 3C:
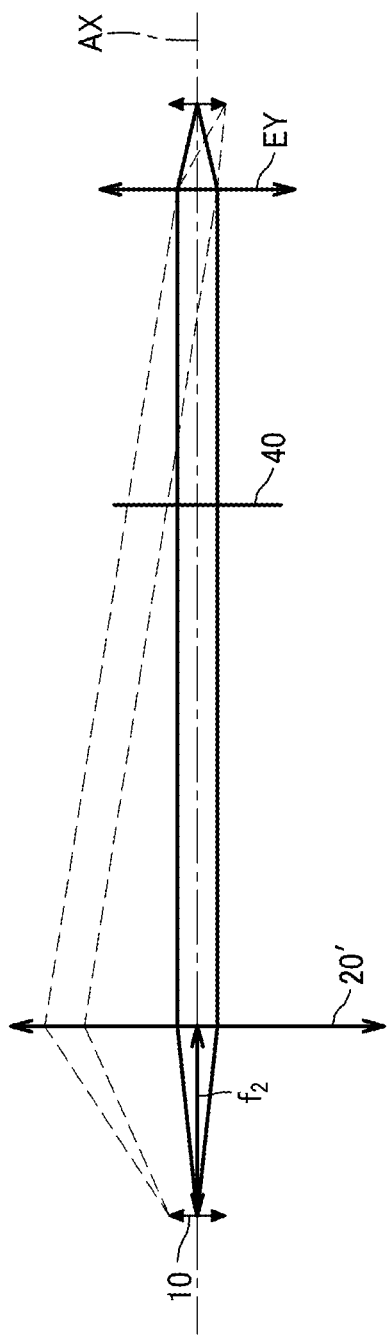

The following describes the reason why the light guide 30 can be made thinner by forming the intermediate image I with the image light emitted from the image display element 10 within the light guide 30 with reference to FIGS. 3A, 3B and 3C.

FIG. 3A is a ray diagram of the virtual image display device 1A according to an embodiment of the present disclosure, in which the intermediate image I has a magnification of 1×. In FIG. 3A, $f_1$ represents the focal distance of the intermediate image former 20, and $f_2$ represents the focal distance of the reflector 40.

FIG. 3B is a ray diagram of a virtual image display device in which the use of the intermediate image former 20 is omitted from the virtual image display device 1A according to an embodiment of the present disclosure. In FIG. 3B, $f_3$ indicates the focal distance of the reflector 40.

FIG. 3C is a ray diagram of a virtual image display device including a propagation optical system 20' instead of the intermediate image former 20 in the virtual image display device 1A according to an embodiment of the present disclosure. The propagation optical system 20' converts the image light from the image display element 10 into collimated light and emits the collimated light toward the light guide 30. In FIG. 3C, the reflector 40 is a reflecting surface (or plane) having no refractive power. The angle of view in FIG. 3C is the same as that of FIG. 3A.

In FIGS. 3A to 3C, an axial light beam is indicated by a solid line, and an off-axis light beam is indicated by a broken line. The size of the display image displayed by the image display element 10 is indicated by arrows at the position of the image display element 10. The size is the same between FIGS. 3A, 3B, and 3C.

In order to allow the wearer to see the scenery and the video of the external world, the distance between the reflector 40 (i.e., the reflecting surface) and the image display element 10 or the intermediate image former 20 is provided sufficiently to achieve the intended performance. In FIG. 3A, the distance between the intermediate image former 20 and the reflector 40 corresponds to the width of the lens portion 3 in the vertical direction (i.e., the y-direction) in FIG. 1. This is because the width of the lens portion 3 in the vertical direction is to be set wide so that the wearer can see the scenery of the outside world. Similarly, in FIG. 3B, the distance between the image display element 10 and the reflector 40, which corresponds to the width of the lens portion 3 in the vertical direction, is to set wide. Similarly, in FIG. 3C, the distance between the propagation optical system 20' and the reflector 40, which corresponds to the width of the lens portion 3 in the vertical direction, is to set wide.

In FIG. 3B in which the virtual-image distance between the eyes EY and a plane onto which the virtual image is formed is set to infinity, the focal distance $f_3$ is increased to cause the axial light beam and the off-axial light beam to proceed in the thin light guide 30. More specifically, the focal distance $f_3$ in FIG. 3B is set so as to correspond to the distance between the image display element 10 and the reflector 40 described above. The image light is collimated by the reflector 40 to allow the wearer to visually identify the virtual image.

As described above, the focal distance $f_3$ is limited by the width of the lens portion 3. For this reason, it is impossible to shorten the focal distance $f_3$. The configuration in FIG. 3B fails to obtain a wider angle of view. In the configuration of FIG. 3B, in order to obtain the angle of view equivalent to that of FIG. 3A, the size of the image display element 10 is to be increased. This, however, increases the size of the virtual image display device itself.

In FIG. 3C in which the virtual-image distance between the eyes EY and a plane onto which the virtual image is formed is set to infinity, the thickness of the light guide 30 is increased in order to obtain the same angle of view as in FIG. 3A (i.e., so that the light guide 30 can also guide an off-axis light beam used for forming a wide angle of view). More specifically, the propagation optical system 20' in FIG. 3C is to be increased in a direction perpendicular to the optical axis AX (the up-to-down direction in the drawing) so as to allow the off-axial rays (indicated by the broken line in FIG. 3C) from the image display element 10 to proceed through the propagation optical system 20'. To further allow the image light emitted from the propagation optical system 20' to proceed in the light guide 30, the thickness of the light guide 30 is increased up-to-down direction in FIG. 3C.

In the virtual image display device 1A according to an embodiment of the present disclosure in FIG. 3A, the intermediate image I is formed at a position closer to the reflector 40 (more specifically, the reflecting surface of the reflector 40) in the light guide 30 so that the focal length $f_2$ can be shortened. This enables a wider angle of view and a thinner light guide 30. In other words, the light guide 30 with its thickness reduced can also guide or allow an off-axis light beam to proceed therein for a wider angle of view.

In particular, as described above, the size of the intermediate image I is minimized in the thickness direction (i.e., the z-direction) of the light guide 30. This configuration allows a much thinner light guide 30 than a case in which the intermediate image I is formed having the same magnification power in each direction.

Preferably, the magnification in the thickness direction (i.e., the z-direction) of the light guide 30 is reduced to produce a small intermediate image I, so as to achieve a thinner light guide 30 (i.e., a lower thickness of the light guide 30 in the z-direction). However, the thickness of the light guide 30 in the width direction (i.e., the x-direction) of the light guide 30 is much greater than the thickness in the thickness direction (i.e., the z-direction). In such a configuration, the magnification of the intermediate image I may not be reduced in the width direction (i.e., the x-direction) of the light guide 30. Rather, it is desirable to set the magnification of the intermediate image I in the width direction of the light guide 30 to a magnification suitable for obtaining a wide eye box.

More specifically, the magnification of the intermediate image I in the fourth direction (i.e., the x-direction) is set so that the image-forming position of light passed through the aperture stop on the optical path between the image display element 10 and the partial reflector 320 is located near the eyes EY of the wearer (for example, a position on the corneal, intersecting the optical axis of the eyes EY). Notably, the image-forming position of light passed through the aperture stop corresponds to a position at which light passed through the aperture stop forms an image, which is caused by the optical system subsequent to the aperture stop (i.e., the position corresponding to the exit pupil position of the optical system subsequent to the aperture stop).

Figure 4A:
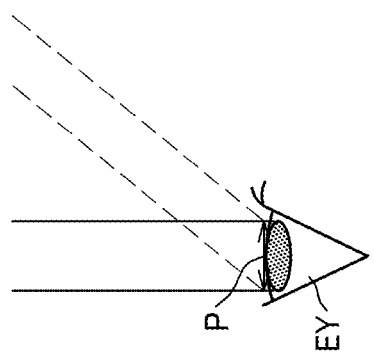
FIG. 4A is a diagram illustrating why an image-forming position of light passed through an aperture stop in the vicinity of the eyes of a wearer enables a wider eye box.
Figure 4B:
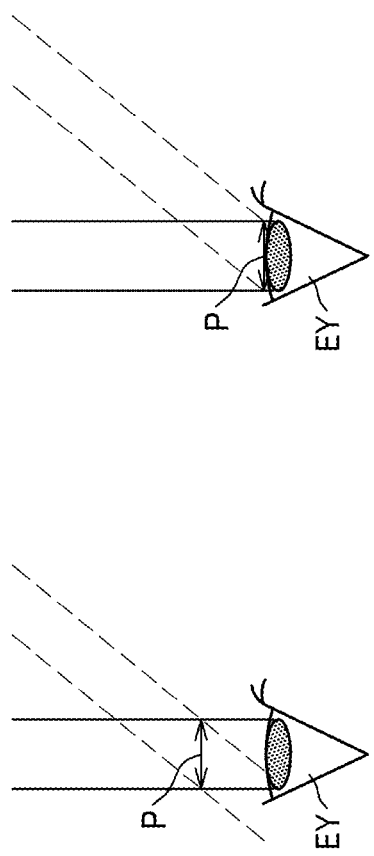
FIG. 4B is another diagram illustrating why the image-forming position of light passed through the aperture stop in the vicinity of the eyes of the wearer enables a wider eye box.

FIGS. 4A and 4B are illustrations for describing why the image-forming position P of light passed through the aperture stop being near the eyes EY of the wearer allows a wider eye box. For convenience of brief description, the eye box is defined by a range in which on-axis light indicated by solid lines in FIGS. 4A and 4B and off-axis light indicated by dotted lines in FIGS. 4A and 4B enter the eyes EY.

As illustrated in FIG. 4A, with the image-forming position P of light passed through the aperture stop being away from the eyes EY of the wearer, most of the off-axis light fails to enter the eyes EY. This hampers the off-axis light from entering the eyes when the wearer slightly moves the line of sight. In other words, the eye box in FIG. 4A is small (or narrow). Although expanding the beam diameter provides a wider eye box, correction of various aberrations will be difficult due to the expansion of the beam diameter.

As illustrated in FIG. 4B, with the image-forming position P of light passed through the aperture stop, near the eyes EY of the wearer, both the off-axis light and the on-axis light enter the eyes EY in a large amount. This allows the off-axis light to enter the eyes irrespective of the wearer's slight movement of the line of sight. In other words, the image-forming position P being near the eyes EY as illustrated in FIG. 4B allows a wider eye box.

Figure 5:
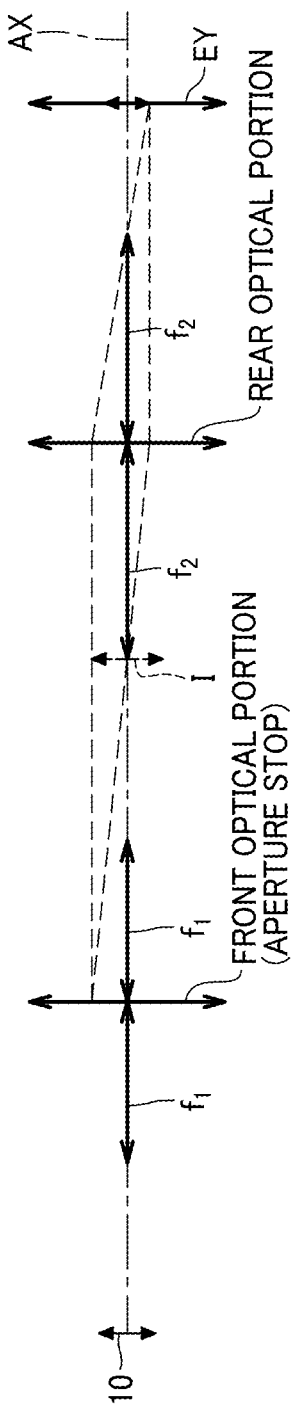
FIG. 5 is an illustration of the relation between the aperture stop and image formation.

FIG. 5 is a schematic diagram illustrating the relation between the aperture stop and image formation. In FIG. 5, it is assumed that the aperture stop is disposed immediately behind the front optical portion. As illustrated in FIG. 5, the image-forming position of the aperture stop is determined in accordance with the focal distance $f_2$ of the rear optical portion. For example, as the focal distance $f_2$ is longer, the image-forming position of light passed through the aperture stop is farther from the rear optical portion. As the focal length $f_2$ is shorter, the image-forming position of light passed through the aperture stop is closer to the rear optical portion.

In the present embodiment, the focal length $f_2$ of the rear optical portion is set shorter in the yz cross-sectional plane (FIG. 2) including the thickness direction (i.e., the z-direction) of the light guide 30, so as to reduce the size (i.e., the size in the z-direction) of the intermediate image I while obtaining a wider angle of view. For this reason, the image-forming position P of light passed through the aperture stop is disposed closer to the rear optical portion than to the eyes EY of the wearer (i.e., the image-forming position is away from the eyes EY of the wearer). This results in a narrower eye box.

In the present embodiment, the light guide 30 includes multiple partial reflectors 320.

The image light is split into multiple light beams by the multiple partial reflectors 320, which provides an eye box that is wide in the y-direction.

However, if the focal length $f_2$ of the second optical portion OP2 is excessively reduced in the xy cross-sectional plane including the width direction (i.e., the x-direction) of the light guide 30, image-forming position P of light passed through the aperture stop will be too close to the rear optical portion (for example, FIG. 4A). This hampers preventing the eye box from becoming narrow. To avoid a narrow eye box by positioning the image-forming position P of the aperture stop near the eye EY, the focal length $f_2$ in the xy cross-sectional plane is set longer than the focal length $f_2$ in the yz cross-sectional plane.

To differentiate the focal length between the xy cross-sectional plane and the yz cross-sectional plane, in the virtual image display device 1A of the present embodiment, the front optical portion is given an anamorphic power to differentiate the magnification in the third direction (e.g., the z-direction) from the magnification in the fourth direction (e.g., the x-direction) for the intermediate image I. In one example, the magnification in the third direction (e.g., the z-direction) is, for example, the minimum magnification among the magnifications in all directions to reduce the thickness of the light guide 30 in the z-direction (i.e., the thickness direction). The magnification in the fourth direction (i.e., the x-direction) for the intermediate image I is, for example, the maximum magnification among the magnifications in all directions to achieve a focal length $f_2$ suitable to position the image-forming position P of light passed through the aperture stop near the eyes EY.

The collimated light, reflected by the partial reflector 320 in the +z-direction, strikes the third face 340 (light emission surface) of the light guide 30. The third face 340 has a negative power. For example, the third face 340 is formed in a concave shape. The concave shape of the third face 340 causes the collimated light to become divergent image light based on the refractive index of the light guide 30 and the curvature of the third face 340, reaching the eye EY of the wearer. The distance to the virtual image (i.e., the distance between the eye EY and a plane on which the virtual image is formed) changes with the divergence of the image light.

The present embodiment enables, for example, setting the distance to the virtual image to be suitable for the use of the virtual image display device 1A by appropriately adjusting the curvature of the third face 340.

Although varying greatly with the use of the virtual image display device 1A, the suitable distance to the virtual image ranges from 20 cm to 2 m.

Additionally, in the comparative example that guides image light by total reflection, the distance to the virtual image is to be set in consideration of the influence of all the reflecting surfaces of the light guide. In the comparative example, the design of the entire light guide 30 is to be changed to obtain a suitable distance to the virtual image.

By contrast, the present embodiment guides the image light in the light guide 30 without total reflection as described above. In this configuration, the curvature of the third face 340 is sufficient to change to obtain the suitable distance to the virtual image.

In the present embodiment, the third face 340 itself of the light guide 30 has a negative power. This eliminates the use of another member such as a concave lens. The virtual image display device 1A allows for a reduction in size and weight and involves fewer optical surfaces through which the image light passes than the configuration including such another member. These surfaces can be elements that cause ghosting or flare.

When a finite distance to the virtual image is set on the front side where the partial reflector 320 reflects the image light, the distance to the virtual image is difficult to appropriately change. For example, the image appears to multiply (in layers) in the direction in which multiple partial reflectors 320 are arranged. In the present embodiment, the distance to the virtual image can be changed with the curvature of the third face 340. This configuration prevents the image from appearing multiple times and enables the suitable distance to the virtual image.

The following describes a specific configuration of the virtual image display device 1A according to the present embodiment.

In order to enable the suitable distance to the virtual image, the virtual image display device 1A may satisfy the following Formula (1) where RA is a paraxial radius of curvature (unit: mm) of the third face 340 that serves as the light emission surface.

$$100 < |RA| < 2000 \qquad \text{Formula (1)}$$

When the absolute value, |RA| is 100 or less, the distance to the virtual image becomes too short. When the absolute value, |RA| is 2000 or greater, the distance to the virtual image becomes too long.

More preferably, the virtual image display device 1A may satisfy the following Formula (2).

$$150 < |RA| < 1000 \qquad \text{Formula (2)}$$

The third face 340 that serves as the light emission surface may be an aspheric surface in order to enhance image quality.

In the light guide 30, an opposing surface 350 opposed to the third face 340 may have a positive power in order to properly adjust the wearer's view of the outside.

Figure 6:
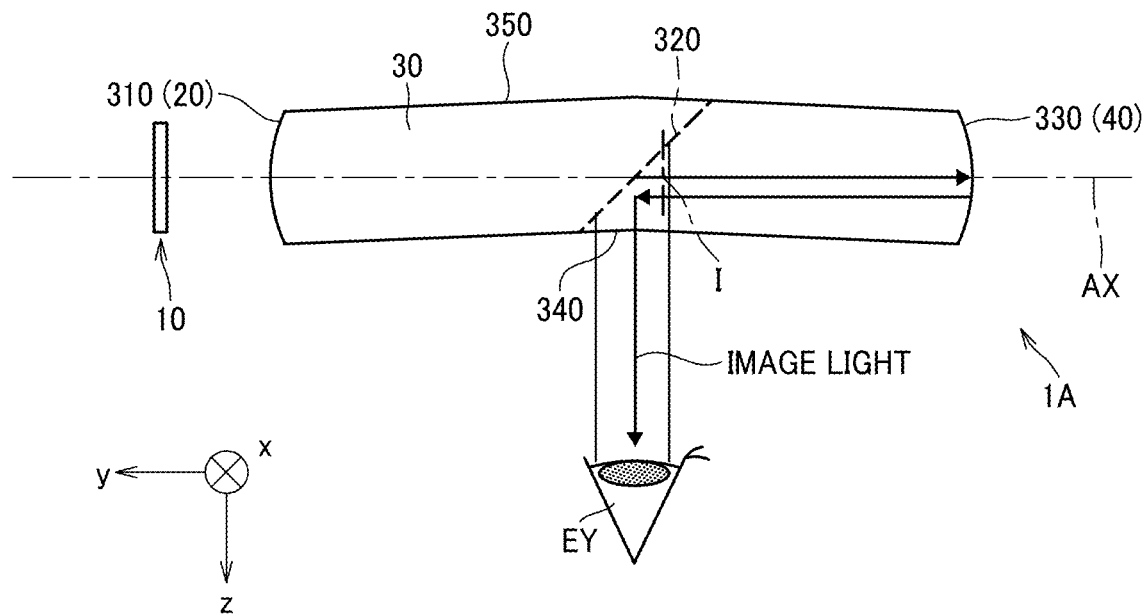
FIG. 6 is a schematic diagram illustrating the configuration of a virtual image display device according to modification 1 of an embodiment of the present disclosure.

FIG. 6 is a schematic diagram of a virtual image display device 1A according to modification 1 of an embodiment of the present disclosure. The virtual image display device 1A according to modification 1 is the same as the virtual image display device 1A in FIG. 2 except for the shape of the opposing surface 350.

In the virtual image display device 1A according to modification 1, the opposing surface 350 has a positive power. For example, as illustrated in FIG. 6, the opposing surface 350 is formed in a convex shape rather than a flat surface.

As described above, giving the third face 340 a negative power enables setting the suitable distance to the virtual image. However, by giving the third face 340 a negative power, the distance to an object outside the virtual image display device 1A as viewed through the light guide 30 also changes. The distance to an object outside the virtual image display device 1A is referred to as the object distance below. To avoid such a situation, the opposing surface 350 is given with a positive power. The positive power of the opposing surface 350 corrects the object distance changed by the negative power of the third face 340.

In the virtual image display device 1A according to modification 1 as well, the image light is guided in the light guide 30 without undergoing total reflection. In this configuration, similarly as in FIG. 2, changing the curvature of the third face 340 is sufficient to obtain the suitable distance to the virtual image.

Further, the opposing surface 350 formed in a convex shape allows for a design closer to glasses.

In FIGS. 2 and 6, the image light from the image display element 10 enters the light guide 30 from a portion corresponding to the upper edge or the lower edge of the lens portion 3. However, no limitation is intended therein.

Figure 7:
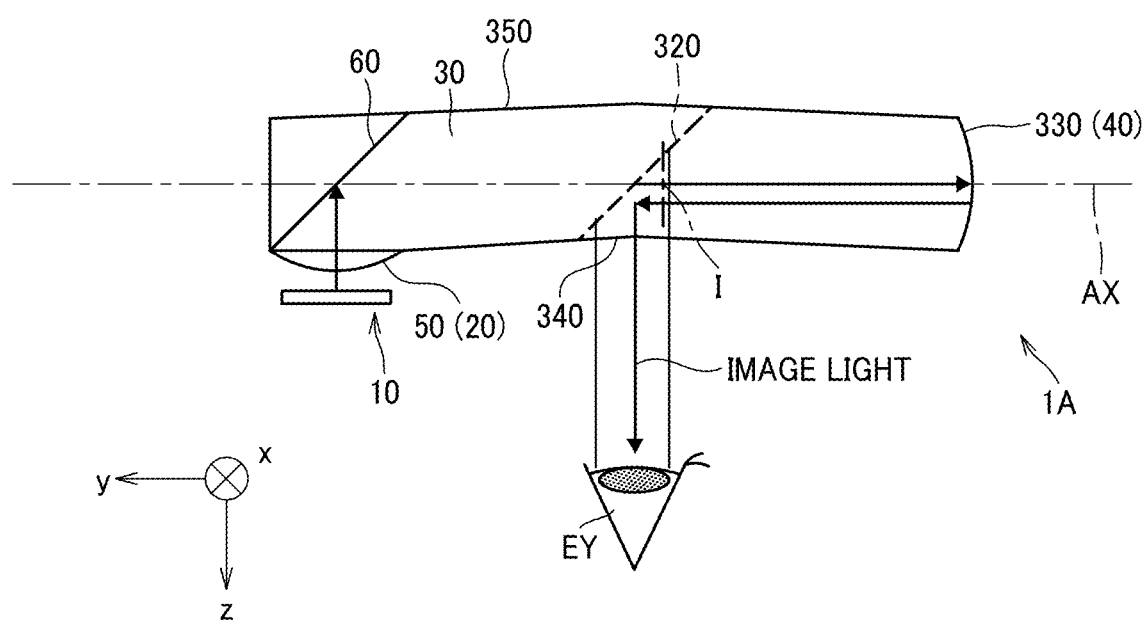
FIG. 7 is a schematic diagram illustrating the configuration of a virtual image display device according to modification 2 of an embodiment of the present disclosure.

FIG. 7 is a schematic diagram of a virtual image display device 1A according to modification 2 of an embodiment of the present disclosure. As illustrated in FIG. 7, the image light from the image display element 10 enters the light guide 30 from the side of the light guide 30, close to the eye EY.

More specifically, the virtual image display device 1A according to modification 2 includes a lens 50, which serves as the intermediate image former 20, is attached to the surface of the light guide 30, close to the eye EY. The virtual image display device 1A further includes a mirror 60 embedded in the light guide 30. The image light passing through the lens 50 enters the light guide 30 and is bent by the mirror 60 to be guided in the −y-direction in the light guide 30.

The virtual image display device 1A offers flexibility in its design, allowing for various modifications.

In order to appropriately correct the object distance, which has been changed by the negative power given to the third face 340, the virtual image display device 1A may satisfy the following Formula (3) where RB is the paraxial radius of curvature (unit: mm) of the opposing surface 350.

$$0.0 < |RA/RB| < 1.1 \qquad \text{Formula (3)}$$

As the absolute value |RA/RB| is closer to 1, the object distance is closer to the object distance when the head-mounted display 1 is not used. When the absolute value |RA/RB| is 0.0 or less, the paraxial radius of curvature RB for the opposing surface 350 is significantly larger than the paraxial radius of curvature RA for the third face 340, resulting in an overly short object distance. When the absolute value |RA/RB| is 1.1 or greater, the paraxial radius of curvature RB for the opposing surface 350 is significantly larger than the paraxial radius of curvature RA for the third face 340, resulting in an overly long object distance.

By increasing the paraxial radius of curvature RB to be larger than the paraxial radius of curvature RA, a power (for example, a prescribed strength) suitable for correction for nearsighted wearer can be obtained. In order to obtain performance suitable for a wearer with astigmatism, the paraxial radius of curvature RB for the opposing surface 350 may vary with the direction depending on the astigmatism axis.

The opposing surface 350 may be formed as an aspheric surface in order to enhance image quality.

The following describes specific Numerical Examples 1 to 5 of the virtual image display device 1A. In Numerical Examples 1 to 5 below, for convenience, the optical axis AX is parallel to the z-direction, and two directions orthogonal to the optical axis AX are the x-direction and the y-direction. In the virtual image display device 1A mounted on a head-mounted display 1, the x-direction is coincident with the width direction of the lens portions 3. The y-direction is orthogonal to the optical axis AX and the width direction of the lens portion 3. When the optical path is bent by 90 degrees by the partial reflector 320, the direction of the optical axis AX is also changed by 90 degrees, so that the xyz coordinate system is also rotated by 90 degrees.

In Numerical Examples 1 and 2, the effective pixel area of the image display element 10 has a rectangular shape of 2.0 mm in the vertical direction, 6.0 mm in the horizontal direction, and 6.32 mm in the diagonal direction.

In Numerical Examples 3 to 5, the effective pixel area of the image display element 10 has a rectangular shape of 3.3 mm in the vertical direction, 5.8 mm in the horizontal direction, and 6.67 mm in the diagonal direction. The spacing of the final surface is the eye relief (15 mm).

The aberration diagrams in Numerical Examples 1 to 5 are calculated in a case where an image is formed with an ideal lens having a focal distance of 17 mm. As indicated in the aberration diagrams to be described later, aberrations are well-corrected in Numerical Examples 1 to 5.

Numerical Example 1

Figure 8A:
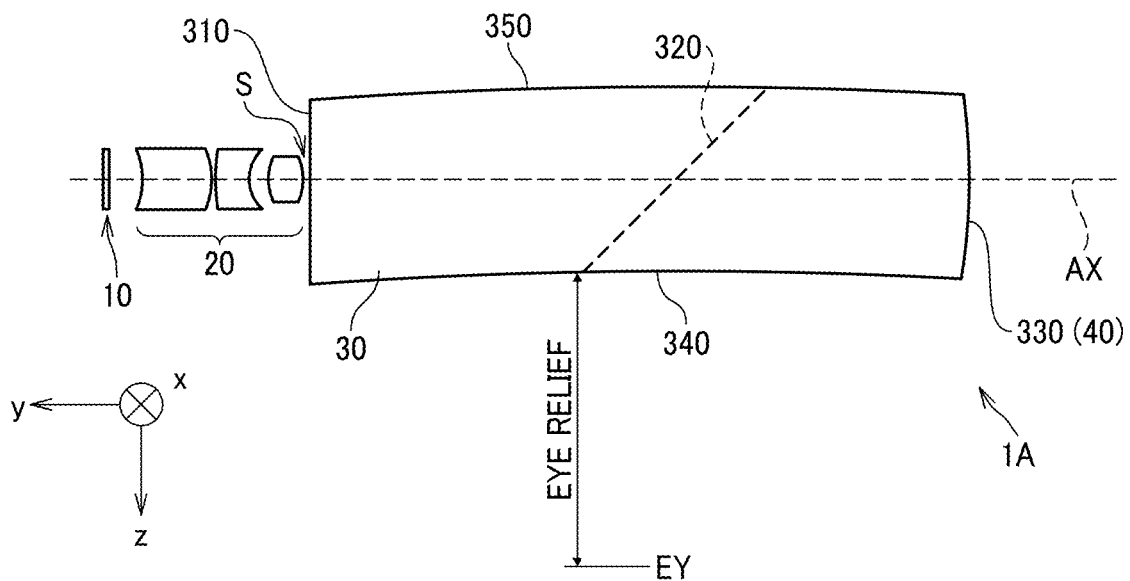
FIG. 8A is a diagram illustrating the optical configuration of a virtual image display device according to Numerical Example 1.
Figure 8B:
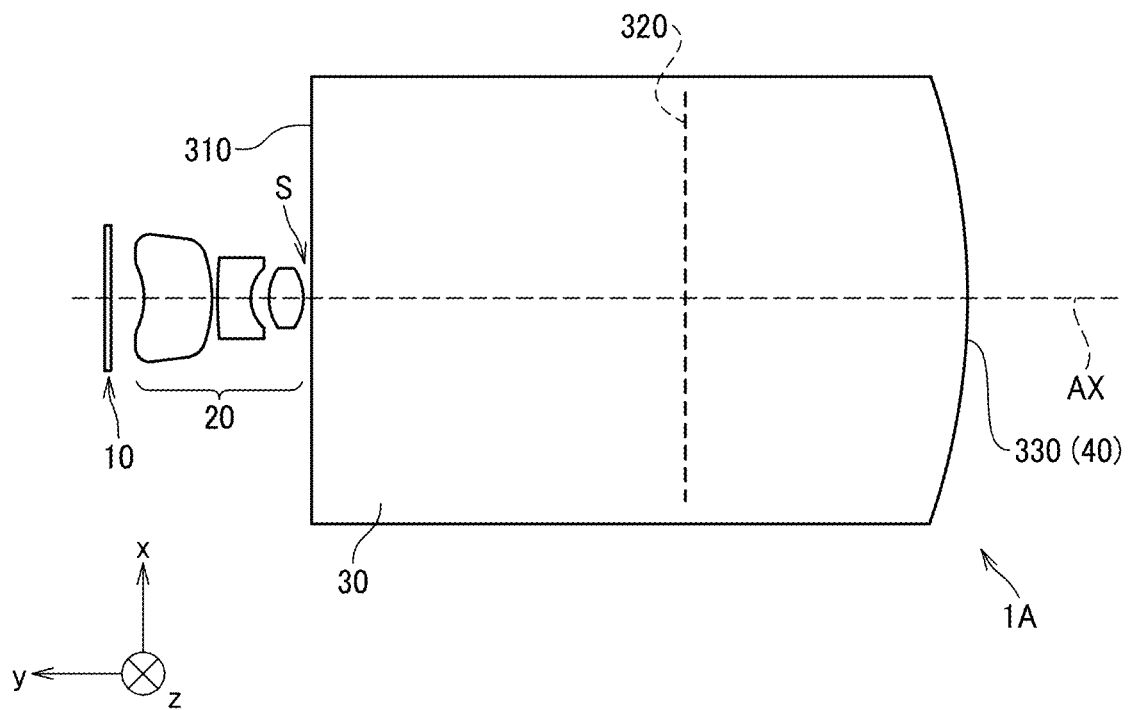
FIG. 8B is another diagram illustrating the optical configuration of the virtual image display device according to Numerical Example 1.

FIGS. 8A and 8B illustrate the optical configuration of the virtual image display device 1A according to Numerical Example 1. FIG. 8A illustrates a yz cross-sectional plane of the virtual image display device 1A according to Numerical Example 1. FIG. 8B illustrates an xy cross-sectional plane of the virtual image display device 1A according to Numerical Example 1. The yz cross-sectional plane in FIG. 8A and the xy cross-sectional plane in FIG. 8B are based on the optical axis AX aligning with the z-direction, directed toward the eye EY of the wearer.

The virtual image display device 1A according to Numerical Example 1 includes an image display element 10, a propagation optical system 20, and a light guide 30 in order from the image display element 10. In Numerical Example 1, one partial reflector 320 formed in a planar shape is included in the light guide 30.

In Numerical Example 1, the angles of view of the virtual image in the vertical direction, the horizontal direction, and the diagonal direction are 13.6 degrees, 38.9 degrees, and 41.8 degrees, respectively. The light guide 30 has a thickness of 10 mm. The distance to the virtual image is 0.6 m.

Table 1 presents a specific numerical configuration of the virtual image display device 1A according to Numerical Example 1. In Table 1, R (mm) represents a radius of curvature (or a paraxial curvature radius) of each surface of the optical component, D (mm) represents the thickness of an optical component or the distance between the optical components along the optical axis AX, Nd represents a refractive index of the d-line (wavelength of 587.562 nm), and νd represents an Abbe number of the d-line. The right column of the Abbe number in Table 1 presents the product name and manufacturer of the material of the optical element.

The numbers in the Table are assigned to the respective surfaces of the virtual image display device 1A in order from the image display element 10. Additionally, the number 0 in the Table indicates an image display surface (i.e., pixel array surface) of the image display element 10. Numbers 1 and 2 in the Table indicate the respective surfaces of the cover glass included in the image display element 10. The cover glass is a glass plate that covers the image display surface of the image display element 10.

Numbers 3 to 8 in the Table indicate the optical surfaces of the propagation optical system 20. Number 9 in the Table indicates the aperture stop S. Numbers 10 to 13 in the Table indicate the optical surfaces between the first face 310 and the third face 340 of the light guide 30, through which the image light passes. The interval D for the number 13 indicates the distance between the third face 340 and the eye EY of the wearer, that is, an eye relief.

In Numerical Example 1, the second face 330 of the light guide 30 is a reflecting surface that reflects the image light transmitted through the partial reflector 320 back to the partial reflector 320.

TABLE 1

|   | R | D | Nd | Vd | | |
|---|---|---|---|---|---|---|
| 0 |  | 0.00 |  |  |  |  |
| 1 | ∞ | 0.30 | 1.51633 | 64.14 |  | S-BSL7(OHARA) |
| 2 | ∞ | 1.71 |  |  |  |  |
| 3* | −3.808 | 3.70 | 1.53100 | 56 |  | E48R(ZEON) |
| 4* | −3.659 | 0.20 |  |  |  |  |
| 5* | 7.667 | 1.79 | 1.63200 | 23 |  | OKP4HT(Osaka Gas Chemicals) |
| 6* | 1.700 | 1.01 |  |  |  |  |
| 7* | 2.743 | 1.81 | 1.53100 | 56 |  | E48R(ZEON) |
| 8* | −3.181 | 0.44 |  |  |  |  |
| 9 | APERTURE STOP | 0.00 |  |  |  |  |
| 10 | 0 | 35.00 | 1.53100 | 56 |  | E48R(ZEON) |
| 11* | −35.922 | −15.00 | 1.53100 | 56 | REFLECTION | E48R(ZEON) |
| 12 | ∞ | 5.00 | 1.53100 | 56 | REFLECTION | E48R(ZEON) |
| 13* | 330.325 | 15.00 |  |  |  |  |

In Table 1, the surfaces marked with "*" represent aspherical surfaces. Table 2 is a list of data on each aspherical surface. In Table 2, the capital letter "E" represents a power in which 10 is the base and the number on the right of E is an exponent. The radius of curvature R of the aspherical surface is represented by a radius of curvature (paraxial radius of curvature) along the optical axis AX. The aspherical shape is given by the following equation, where Z is a sag amount, C is a paraxial radius of curvature (1/R), h is a height from the optical axis AX (mm), K is a conic constant, and $A_4$, $A_6$, are aspherical coefficients of even orders equal to or higher than the fourth order.

$$Z = Ch^2/\{1+\sqrt{(1-(1+k)c^2h^2)}\} + a^4 \cdot h^4 + a^6 \cdot h^6 + a^8 \cdot h^8 + a^{10} \cdot h^{10}$$

TABLE 2

|   | K | A4 | A6 | A8 | A10 |
|---|---|---|---|---|---|
| 3 | 0.000 | 1.41155E−02 | −7.60102E−04 | 1.45599E−04 | −5.75784E−06 |
| 4 | 0.000 | 2.19417E−02 | −5.45145E−03 | 1.14178E−03 | −7.99615E−05 |
| 5 | 0.000 | −1.07129E−02 | −4.74964E−03 | 2.81042E−03 | −4.20669E−04 |
| 6 | 0.000 | −7.45109E−02 | 1.22344E−02 | 2.03084E−03 | −2.88168E−03 |
| 7 | 0.000 | −6.33545E−03 | 4.17444E−03 | 1.40828E−03 | −5.36776E−04 |
| 8 | 0.000 | 1.29012E−02 | −4.76378E−04 | 4.95112E−03 | −1.59960E−03 |
| 11 | 0.000 | 1.74873E−06 | 9.50847E−08 | −6.04434E−10 | 7.29808E−13 |
| 13 | 0.000 | −1.36000E−07 | 2.97000E−09 | −1.62000E−11 | 4.78000E−14 |

Table 3 presents data of the surface shape of the opposing surface 350 of the light guide 30 according to Numerical Example 1.

TABLE 3

| | SHAPE OF OPPOSED FACES | | | | |
|---|---|---|---|---|---|
| | R | K | A4 | A6 | A8 | A10 |
| EXAMPLE 1 | 334.244 | 0.000 | −1.30201E−07 | 1.68226E−09 | −5.79594E−12 | 7.91735E−15 |

The same format as described above applies to the following Numerical Examples 1 to 5.

FIGS. 9A and 9B illustrate lateral aberration diagrams when image light from the image display element 10 passes through the optical system for the virtual image display device (the propagation optical system 20 and the light guide 30) according to Numerical Example 1 of the present disclosure.

Figure 11:
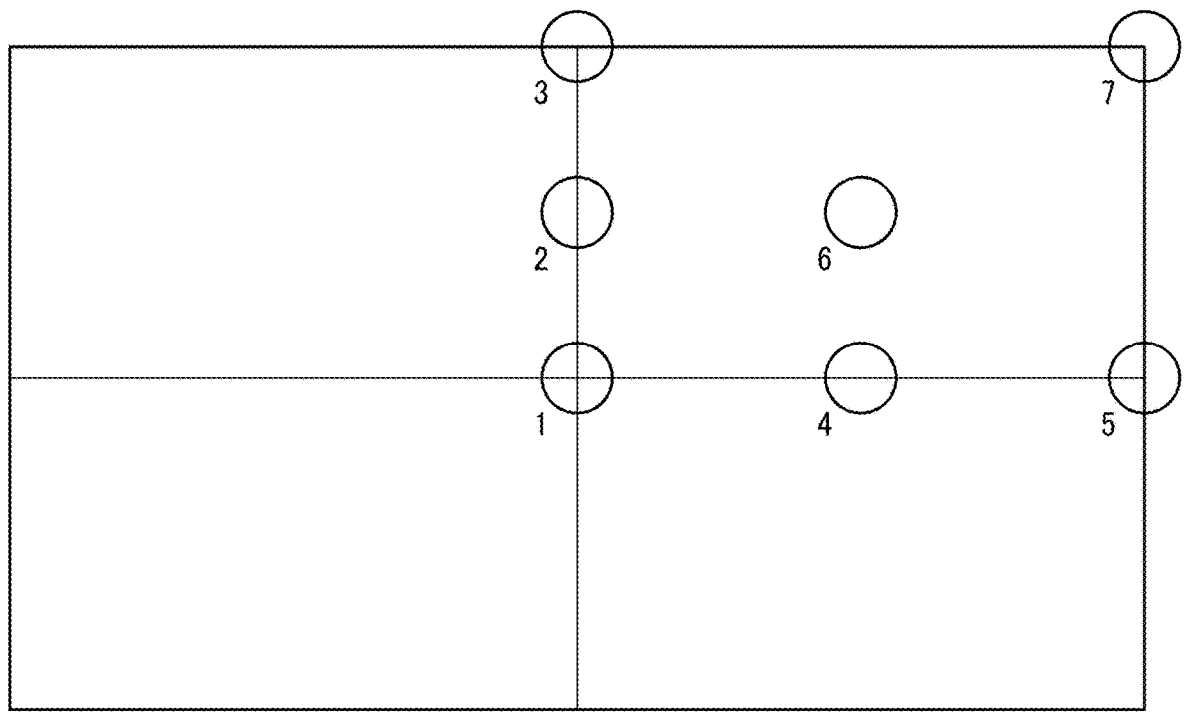
FIG. 11 is a diagram illustrating the measurement position of each of the lateral aberrations according to Numerical Examples.

The lateral aberration diagrams in FIGS. 9A and 9B indicate lateral aberrations for the d-line and the g-line (wavelengths of 435, 834 nm) at coordinates 1 to 7 in the virtual image. The positions of the coordinates 1 to 7 are illustrated in FIG. 11.

In each of FIGS. 9A and 9B, the solid line indicates the lateral aberration for the d-line, and the broken line indicates the lateral aberration for the g-line. The lateral aberration is measured in each of the x-direction and the y-directions. The left diagram ("Y-FAN" noted at the top) of each of FIGS. 9A and 9B indicates lateral aberration in the y-direction, and the right diagram ("X-FAN" noted at the top) of each of FIGS. 9A and 9B indicates lateral aberration in the x-direction.

Figure 10:
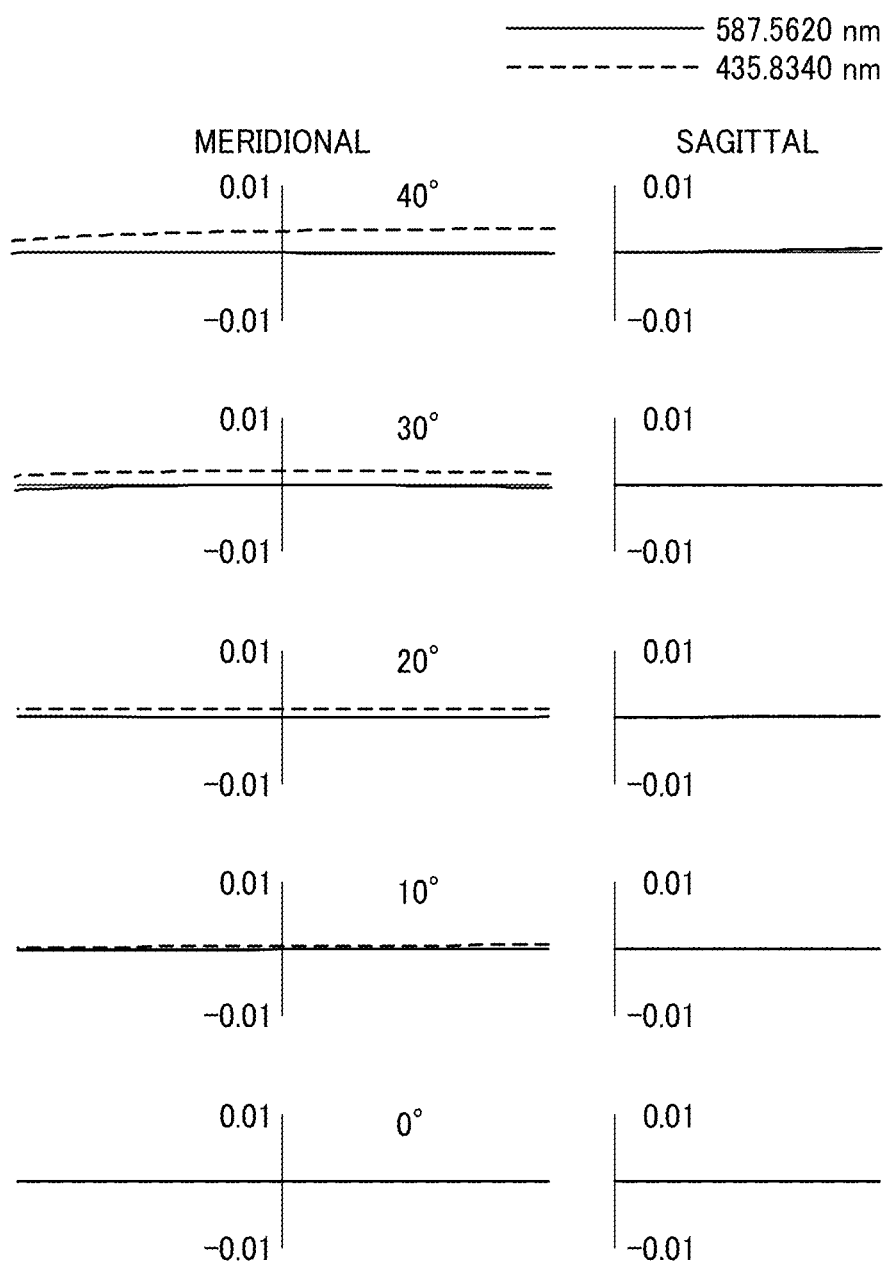
FIG. 10 illustrates lateral aberration diagrams when light from an object at infinity passes through a light guide according to Numerical Example 1 of the present disclosure.

FIG. 10 illustrates lateral aberration diagrams when light from an object at infinity passes through the light guide 30 according to Numerical Example 1 of the present disclosure.

FIG. 10 illustrates the lateral aberrations in the meridional direction and the sagittal direction for the angles of view of 0°, 10°, 20°, 30°, and 40°, respectively.

In Numerical Example 1, the propagation optical system 20 forms an intermediate image I within the light guide 30, which allows a thinner light guide 30 and guides the image light in the light guide 30 without total reflection. Further, the third face 340 of the light guide 30 has a negative power, enabling the suitable distance to the virtual image. Numerical Example 1 satisfies all of the above Formulae (1) to (5) as described below.

Absolute value |RA|: 330.33 (see Formulae (1) and (2))
Absolute value |RA/RB|: 0.99 (see Formula (3))

In the virtual image display device 1A according to Numerical Example 1, various aberrations are successfully corrected (see FIGS. 9A and 9B), a wide angle of view (for example, an angle of view exceeding 40 degrees in a diagonal direction) is obtained, and desired image quality is achieved. The object distance changed by the negative power of the third face 340 is well corrected (see FIG. 10).

Numerical Example 2

Figure 12:
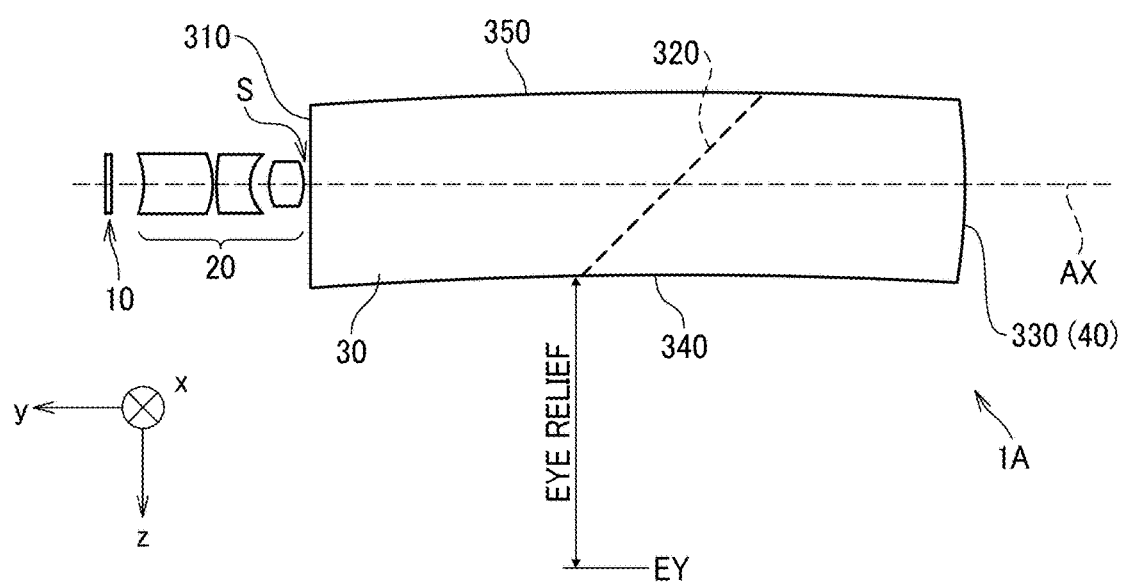
FIG. 12 is a diagram illustrating the optical configuration of a virtual image display device according to Numerical Example 2.

FIG. 12 is a diagram illustrating the optical configuration of a virtual image display device 1A according to Numerical Example 2.

FIG. 12 illustrates a yz cross-sectional plane of the virtual image display device 1A according to Numerical Example 2.

The virtual image display device 1A according to Numerical Example 2 has a similar configuration to that of the virtual image display device 1A according to Numerical Example 1 except for the surface shape of the opposing surface 350. In the following description of Numerical Example 2, the description of portions that overlap with those of Numerical Example 1 (e.g., the description of the xy cross-sectional view of the virtual image display device 1A) is omitted.

Table 4 presents data on the surface shape of the opposing surface 350 of the light guide 30 according to Numerical Example 2.

TABLE 4

| | SHAPE OF OPPOSED FACES | | | | |
|---|---|---|---|---|---|
| | R | K | A4 | A6 | A8 | A10 |
| EXAMPLE 2 | 514.138 | 0.000 | −2.01998E−08 | 2.19092E−09 | −7.36252E−12 | 9.37163E−15 |

Figure 13:
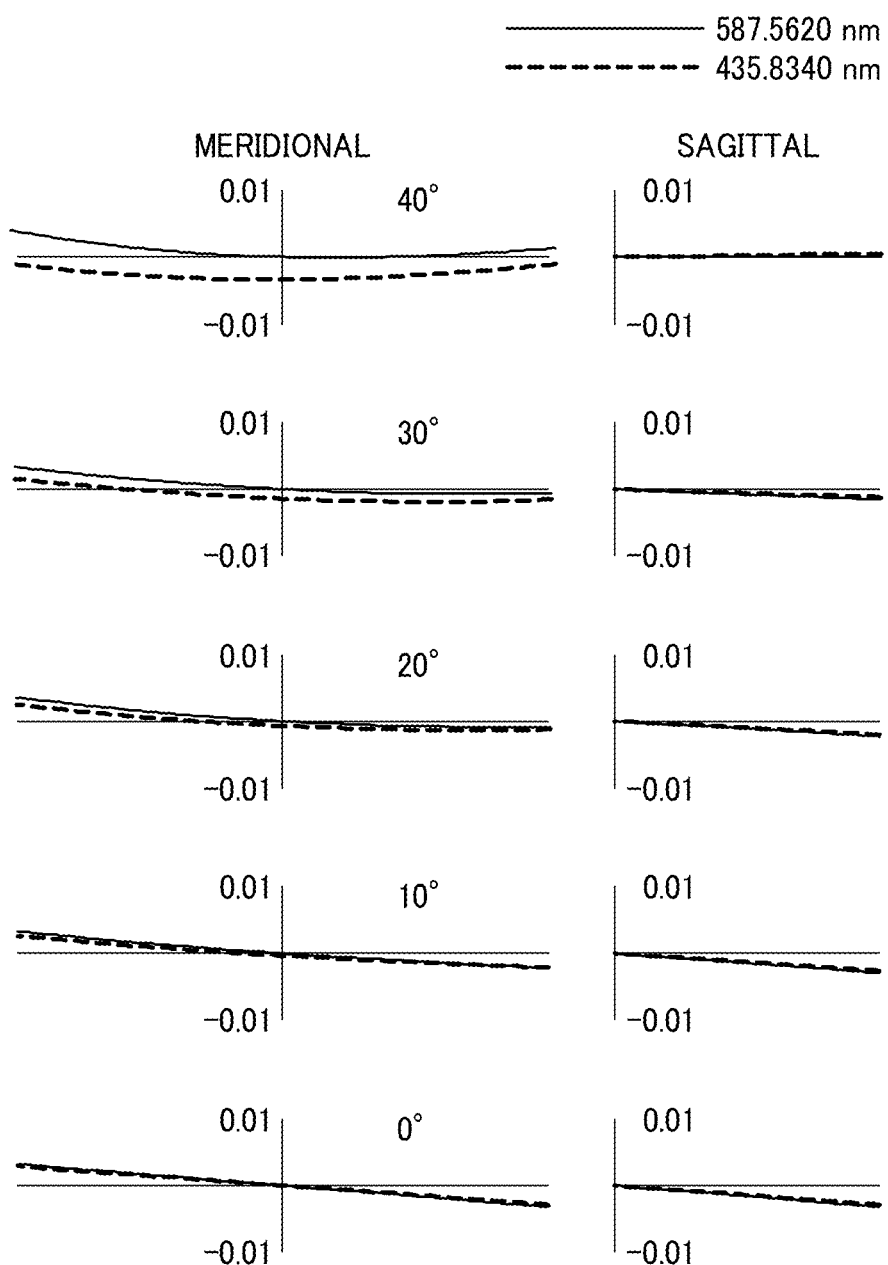
FIG. 13 illustrates lateral aberration diagrams when light from an object at infinity passes through a light guide according to Numerical Example 2 of the present disclosure.

FIG. 13 illustrates lateral aberration diagrams when light from an object at infinity passes through the light guide 30 according to Numerical Example 2 of the present disclosure.

In Numerical Example 2 as well, the propagation optical system 20 forms an intermediate image I within the light guide 30, which allows a thinner light guide 30 and guides the image light in the light guide 30 without total reflection. Further, the third face 340 of the light guide 30 has a negative power, enabling the suitable distance to the virtual image. Numerical Example 2 also satisfies all of the above conditional expressions (1) to (3) as described below.

Absolute value |RA|: 330.33 (see Formulae (1) and (2))

Absolute value |RA/RB|: 0.64 (see Formula (3))

In the virtual image display device 1A according to Numerical Example 2 as well, various aberrations are successfully corrected (see FIG. 9A and FIG. 9B), a wide angle of view (for example, an angle of view exceeding 40 degrees in a diagonal direction) is obtained, and desired image quality is achieved. The object distance changed by the negative power of the third face 340 is well corrected (see FIG. 13).

Numerical Example 3

Figure 14A:
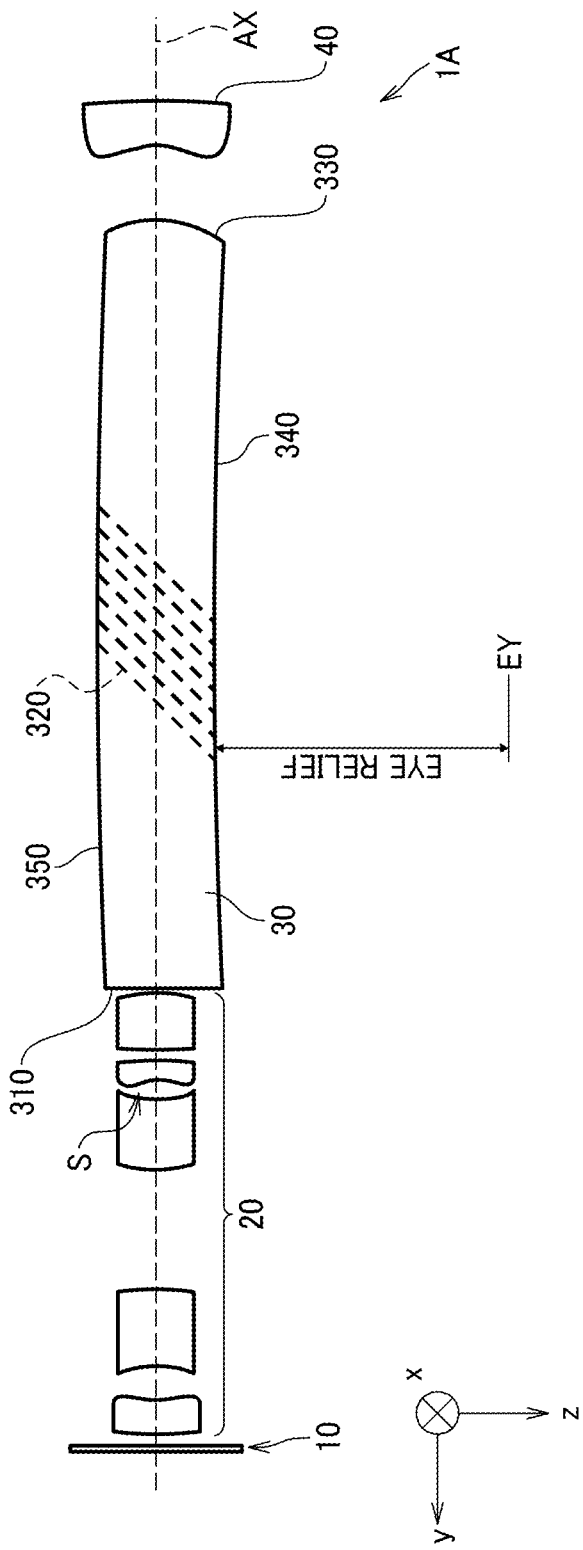
FIG. 14A is a diagram illustrating the optical configuration of a virtual image display device according to Numerical Example 3.

FIGS. 14A and 14B illustrate the optical configuration of the virtual image display device 1A according to Numerical Example 3.

The virtual image display device 1A according to Numerical Example 3 includes an image display element 10, a propagation optical system 20, a light guide 30, and a reflector 40 that is independent of a second face 330 (the light guide 30), which are arranged in order from the image display element 10. In Numerical Example 3, seven partial reflectors 320 formed in a planar shape are included in the light guide 30.

In Numerical Example 3, the angles of view of the virtual image in the vertical direction, the horizontal direction, and the diagonal direction are 20.7 degrees, 34.5 degrees, and 39.4 degrees, respectively. The light guide 30 has a thickness of 5 mm.

The distance to the virtual image is 0.5 m.

Table 5 presents a specific numerical configuration of the virtual image display device 1A according to Numerical Example 3. In Table 5, Ry is a radius of curvature (or a paraxial radius of curvature) (mm) of each surface of the optical elements in the y-direction (i.e., the y-axis orthogonal to the optical axis AX), and Rx is a radius of curvature (or a paraxial radius of curvature) (mm) of each surface of the optical elements in the x-direction (the x-axis orthogonal to the optical axis AX).

Number 0 in the Table indicates an image display surface (i.e., pixel array surface) of the image display element 10. Numbers 1 and 2 in the Table indicate the respective surfaces of the cover glass included in the image display element 10. The cover glass is a glass plate that covers the image display surface of the image display element 10.

Numbers 3 to 13 in the Table indicate the optical surfaces of the propagation optical system 20. Number 9 in the Table indicates the aperture stop S. Numbers 14 to 21 in the Table indicate the optical surfaces between the first face 310 and the third face 340 of the light guide 30, through which the image light passes. The spacing D for number 21 represents the eye relief.

The mark "A" in the column of the interval D for number 19 in Table 1 indicates the distance between the second face 330 and each partial reflector 320 (partial reflection surface) along the optical axis AX. For convenience, this distance will be referred to as distance A. The distances A to the seven lenses are −21 mm, −20 mm, −19 mm, −18 mm, −17 mm, −16 mm, and −15 mm in order from the partial reflector 320 closest to the second face 330 among the seven partial reflectors 320. In other words, the seven partial reflectors 320 are disposed at equal intervals of 1 mm.

In Numerical Example 3, the convex lens surface of the reflector 40 is a reflecting surface that reflects the image light transmitted through the partial reflector 320 back to the partial reflector 320.

TABLE 5

| | Rv | Rx | D | Nd | Vd | | |
|---|---|---|---|---|---|---|---|
| 0 | ∞ | ∞ | 0.00 | | | | |
| 1 | ∞ | ∞ | 0.30 | 1.51633 | 64.14 | | S-BSL7(OHARA) |
| 2 | ∞ | ∞ | 0.57 | | | | |
| 3** | 5.669 | −28.412 | 1.41 | 1.63200 | 23 | | OKP4HT(Osaka Gas Chemicals) |
| 4** | 2.799 | −23.894 | 1.41 | | | | |
| 5** | 18.620 | 34.564 | 3.41 | 1.53100 | 56 | | E48R(ZEON) |
| 6** | −21.411 | −7.546 | 5.36 | | | | |
| 7** | 6.228 | 5.854 | 3.00 | 1.53100 | 56 | | E48R(ZEQN) |
| 8** | −65.103 | −15.859 | 0.00 | | | | |
| 9 | APERTURE STOP | | 0.76 | | | | |
| 10** | −3.086 | 112.703 | 0.90 | 1.63200 | 23 | | OKP4HT(Osaka Gas Chemicals) |
| 11** | −11.052 | 6.755 | 0.43 | | | | |
| 12** | 10.663 | 5.888 | 2.50 | 1.53100 | 56 | | E48R(ZEON) |
| 13** | −4.689 | −23.295 | 0.20 | | | | |
| 14 | ∞ | ∞ | 33.50 | 1.53100 | 56 | | E48R(ZEON) |
| 15** | −4.506 | −33.922 | 3.21 | | | | |
| 16** | −4.631 | −17.048 | 1.97 | 1.53100 | 56 | REFLECTION | E48R(ZEON) |
| 17** | −30.441 | −32.101 | −1.97 | 1.53100 | 56 | | E48R(ZEON) |
| 18** | −4.631 | −17.048 | −3.21 | | | | |
| 19** | −4.506 | −33.922 | A | 1.53100 | 56 | | E48R(ZEON) |
| 20 | ∞ | ∞ | 2.50 | 1.53100 | 56 | REFLECTION | E48R(ZEON) |
| 21* | 275.056 | | 15.00 | | | | |

In Table 5, the surfaces with the numbers marked with "**" are anamorphic aspherical surfaces having an anamorphic power. Further, the shape of the anamorphic aspherical surface satisfies the following equation where Cx is a paraxial radius of curvature (1/Rx) in the x-axis, Cy is a paraxial radius of curvature (1/Ry) in the y-axis, X (mm) is the height in the x-axis from the optical axis AX, Y (mm) is the height in the y-axis from the optical axis AX, Kx is the conic constant in the x-axis, Ky is the conic coefficient in the y-axis, $AR_4$, $AR_6$, are even-numbered coefficients of rotational symmetry equal to or higher than the fourth order, and $AP_4$, $AP_6$, are even-numbered coefficients of rotational asymmetry equal to or higher than the fourth order.

$$Z=(CxX^2+CyY^2)/\{1+\sqrt{(1-(1+Kx)Cx^2X^2-(1+Ky)Cy^2Y^2)}\}+AR_4((1-AP_4)X^2+(1+AP_4)Y^2)^2+AR_6((1-AP_6)X^2+(1+AP_6)Y^2)^3+AR_8((1-AP_8)X^2+(1+AP_8)Y^2)^4+AR_{10}\cdot((1-AP_{10})X^2+(1+AP_{10})Y^2)^5$$

Table 6 is a list of data on the aspherical surfaces in Numerical Example 3.

TABLE 6

| CONIC COEFFICIENT | | |
|---|---|---|
| | Ky | Kx |
| 3 | 0.000 | 0.000 |
| 4 | 0.000 | 0.000 |
| 5 | 0.000 | 0.000 |
| 6 | −127.395 | −11.481 |
| 7 | 1.658 | −0.086 |
| 8 | 0.000 | 0.000 |
| 10 | 0.000 | 0.000 |
| 11 | 0.000 | 0.000 |
| 12 | −5.225 | 0.799 |
| 13 | 0.000 | 0.000 |
| 15, 19 | −0.085 | −3.497 |
| 16, 17 | −0.358 | −0.266 |
| 18 | 0.000 | 0.000 |

| COEFFICIENT OF ROTATIONAL SYMMETRY | | | | |
|---|---|---|---|---|
| | $AR_4$ | $AR_6$ | $AR_8$ | $AR_{10}$ |
| 3 | −7.73123E−03 | −3.51289E−05 | 7.62856E−06 | 1.85801E−11 |
| 4 | −1.17866E−02 | 5.68737E−06 | −1.87692E−04 | 1.97018E−05 |
| 5 | −4.41413E−03 | −3.91897E−06 | −2.14961E−04 | −3.48629E−08 |
| 6 | −2.54578E−03 | 1.56024E−04 | −9.83271E−06 | 1.74249E−07 |
| 7 | 4.50406E−04 | −2.99426E−05 | −8.07497E−05 | 2.59875E−08 |
| 8 | −9.57945E−05 | 1.34175E−05 | 1.17411E−06 | 3.72008E−05 |

TABLE 6-continued

| | | | | |
|---|---|---|---|---|
| 10 | −7.77583E−04 | −9.18008E−06 | 6.21665E−07 | 6.69977E−05 |
| 11 | 1.15037E−04 | −7.61688E−05 | −5.65925E−07 | −5.66392E−10 |
| 12 | −1.48320E−03 | −6.16248E−05 | −1.68368E−07 | −2.80790E−10 |
| 13 | 4.52251E−04 | 3.99524E−08 | 1.47564E−13 | −6.89083E−07 |
| 15, 19 | −5.30808E−08 | 5.94093E−06 | 7.47250E−11 | 5.15744E−09 |
| 16, 17 | −2.24024E−06 | 5.51073E−11 | −3.82564E−12 | 6.26365E−07 |
| 18 | −7.60837E−06 | −1.98635E−08 | 1.30622E−10 | −5.94934E−13 |

| COEFFICIENT OF ROTATIONAL ASYMMETRY | | | | |
|---|---|---|---|---|
| | $AP_4$ | $AP_6$ | $AP_8$ | $AP_{10}$ |
| 3 | 7.56652E−01 | −1.35523E+00 | −4.16576E−01 | −7.88735E+00 |
| 4 | 8.98361E−01 | 3.10836E+00 | 1.26448E+00 | 1.25338E+00 |
| 5 | 8.88786E−01 | 3.01173E+00 | 1.01602E+00 | −2.22718E−01 |
| 6 | −5.82259E−02 | −6.98181E−02 | 6.25123E−03 | 3.87566E−03 |
| 7 | 5.03527E−01 | 3.66392E−01 | 1.11608E+00 | −1.04231E−02 |
| 8 | −3.17812E−01 | 5.96345E−01 | 2.03828E+00 | 1.24013E+00 |
| 10 | −1.47707E−01 | −6.12941E−01 | 2.34992E+00 | 1.21051E+00 |
| 11 | −1.50323E−02 | 1.41096E+00 | 2.13194E+00 | 4.02155E+00 |
| 12 | 1.10849E−01 | 1.43285E+00 | −1.19221E+00 | 3.88434E+00 |
| 13 | 1.05405E−01 | −4.67819E+00 | 5.53378E+01 | 6.06683E−01 |
| 15, 19 | −1.48891E+01 | 9.68270E−01 | −2.97324E−01 | 1.12989E+00 |
| 16, 17 | −2.36621E+00 | 1.35375E+01 | −1.67175E+00 | 1.03072E+00 |
| 18 | 1.90536E−01 | −1.62582E−02 | −6.21050E−02 | 1.04507E−01 |

| | K | A4 | A6 | A8 | A10 |
|---|---|---|---|---|---|
| 21 | 0.000 | −2.52685E−06 | 1.52232E−08 | −4.89375E−11 | 5.97687E−14 |

Table 7 presents data on the surface shape of the opposing surface 350 of the light guide 30 according to Numerical Example 3.

TABLE 7

| | SHAPE OF OPPOSED FACES | | | | | |
|---|---|---|---|---|---|---|
| | R | K | A4 | A6 | A8 | A10 |
| EXAMPLE 3 | 334.244 | 0.000 | 0.00000E+00 | 0.00000E+00 | 0.00000E+00 | 0.00000E+00 |

Figure 15A:
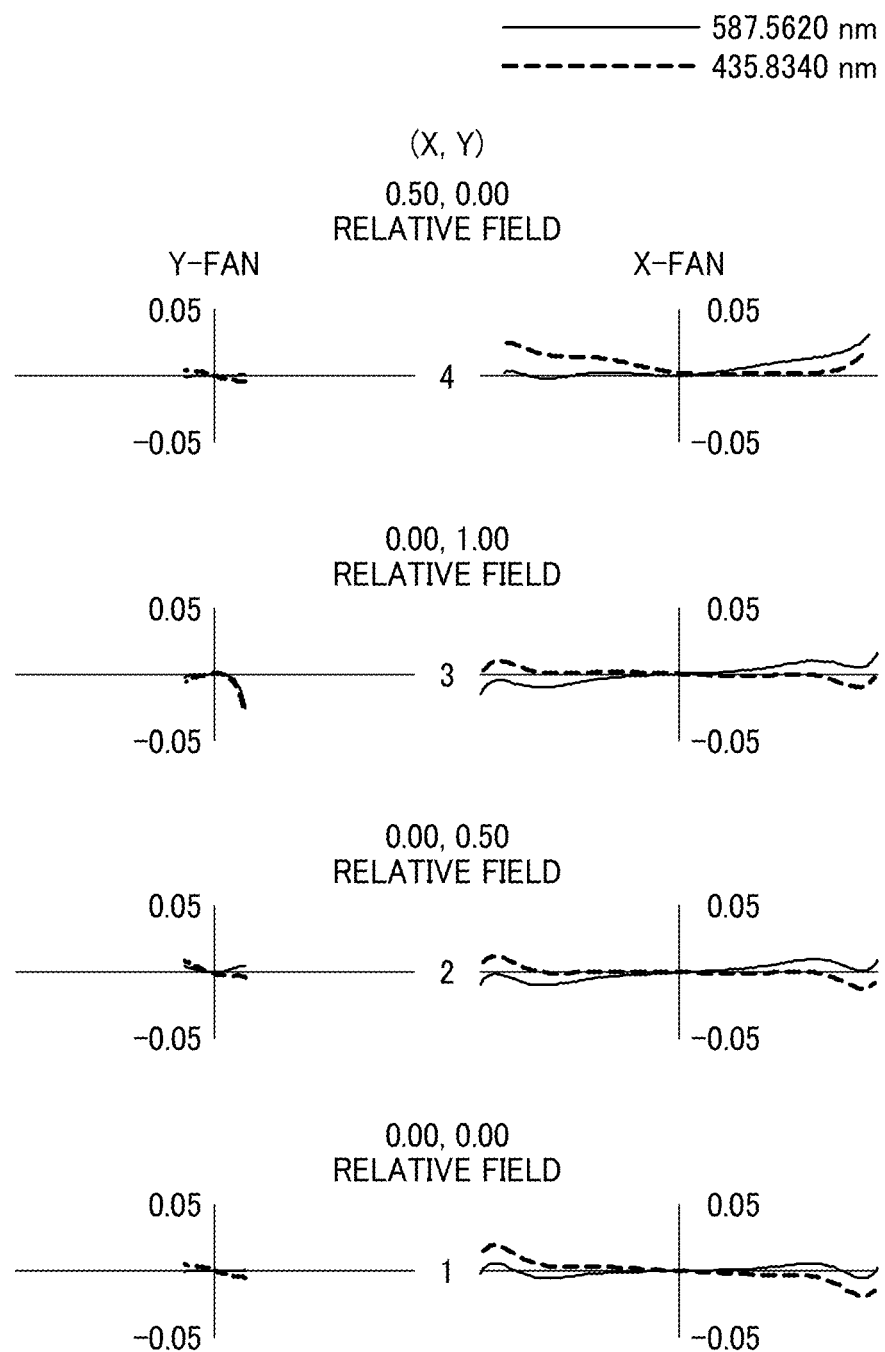
FIG. 15A illustrates lateral aberration diagrams when image light passes through the optical system for a virtual image display device according to Numerical Example 3 of the present disclosure.

FIGS. 15A and 15B illustrate lateral aberration diagrams when image light from the image display element 10 passes through the optical system for the virtual image display device (the propagation optical system 20, the light guide 30, and the reflector 40) according to Numerical Example 3 of the present disclosure.

FIG. 16 illustrates lateral aberration diagrams when light from an object at infinity passes through the light guide 30 according to Numerical Example 3 of the present disclosure.

In Numerical Example 3, an intermediate image I is formed within the light guide 30 using an anamorphic power. The intermediate image I has the first magnification in the third direction and the second magnification in the fourth direction. The light guide 30 according to Numerical Example 3 can be thinner than those of Numerical Examples 1 and 2.

In Numerical Example 3 as well, the propagation optical system 20 forms an intermediate image I within the light guide 30, which allows a thinner light guide 30 and guides the image light in the light guide 30 without total reflection. Further, the third face 340 of the light guide 30 has a negative power, enabling the suitable distance to the virtual image. Numerical Example 3 also satisfies all of the above conditional expressions (1) to (3) as described below.

Absolute value |RA|: 275.06 (see Formulae (1) and (2))
Absolute value |RA/RB|: 0.82 (see Formula (3))

In the virtual image display device 1A according to Numerical Example 3 as well, various aberrations are successfully corrected (see FIG. 15A and FIG. 15B), a wide angle of view (for example, an angle of view close to 40 degrees in a diagonal direction) is obtained, and desired image quality is achieved. The object distance changed by the negative power of the third face 340 is well corrected (see FIG. 16).

Numerical Example 4

Figure 17:
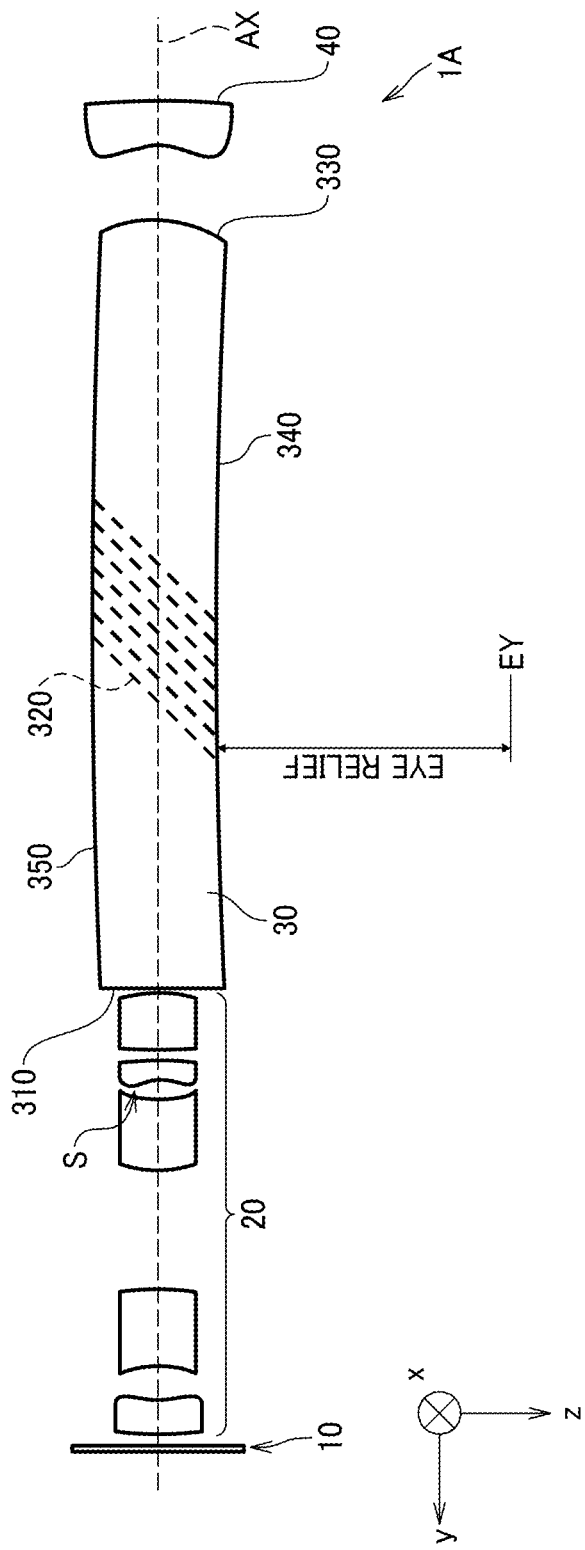
FIG. 17 is a diagram illustrating the optical configuration of a virtual image display device according to Numerical Example 4.

FIG. 17 is a diagram illustrating the optical configuration of a virtual image display device 1A according to Numerical Example 4.

FIG. 17 illustrates a yz cross-sectional plane of the virtual image display device 1A according to Numerical Example 4.

The virtual image display device 1A according to Numerical Example 4 has a similar configuration to that of the virtual image display device 1A according to Numerical Example 3 except for the surface shape of the opposing surface 350. In the following description of Numerical Example 4, the description of portions that overlap with those of Numerical Example 3 (e.g., the description of the xy cross-sectional view of the virtual image display device 1A) is omitted.

Table 8 presents data on the surface shape of the opposing surface 350 of the light guide 30 according to Numerical Example 4.

TABLE 8

| | SHAPE OF OPPOSED FACES | | | | | |
|---|---|---|---|---|---|---|
| | R | K | A4 | A6 | A8 | A10 |
| EXAMPLE 4 | 1825.483 | 0.000 | 5.36570E−07 | 4.63857E−10 | −5.55087E−12 | 1.04299E−14 |

Figure 18:
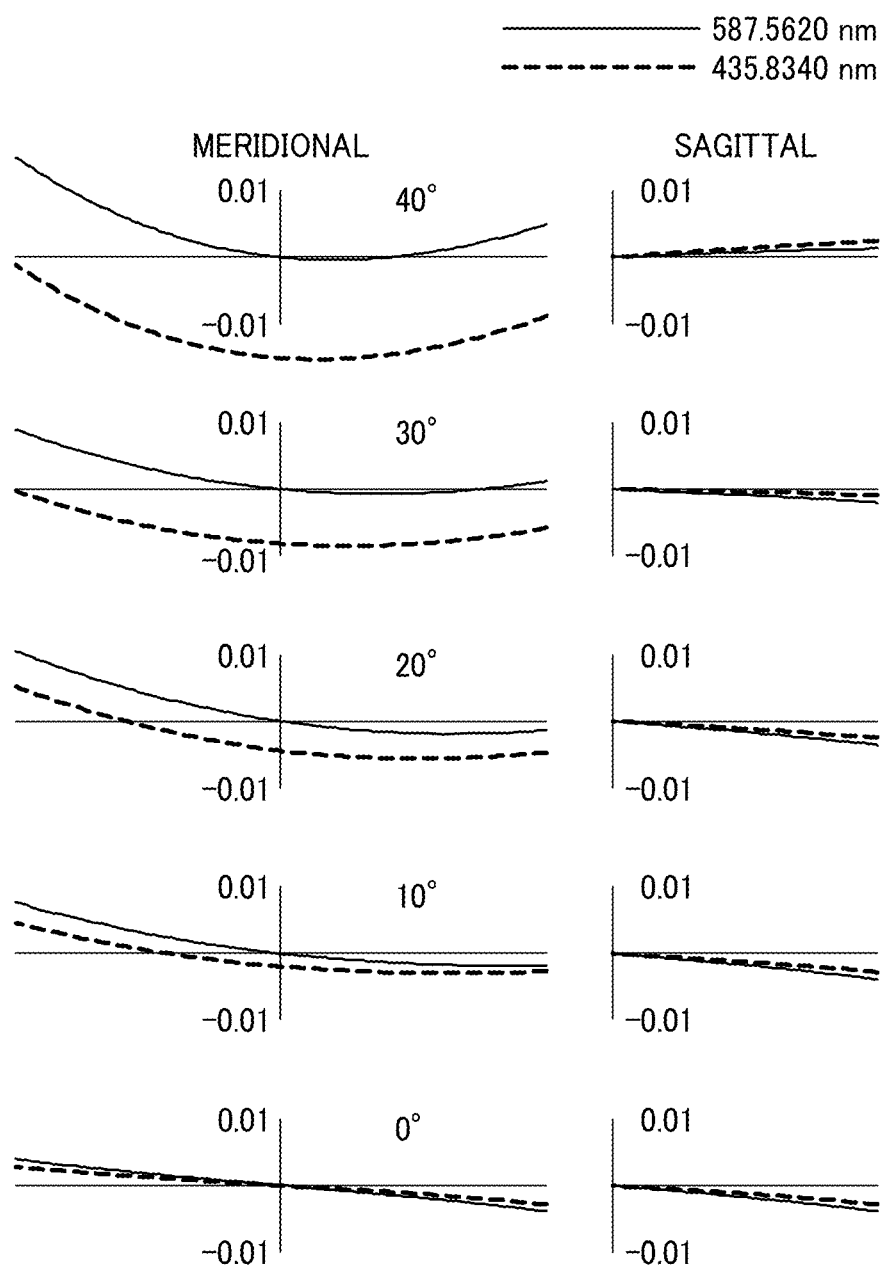
FIG. 18 illustrates lateral aberration diagrams when light from an object at infinity passes through a light guide according to Numerical Example 4 of the present disclosure.

FIG. 18 illustrates lateral aberration diagrams when light from an object at infinity passes through the light guide 30 according to Numerical Example 4 of the present disclosure.

In Numerical Example 4 as well, an intermediate image I is formed within the light guide 30 using an anamorphic power. The intermediate image I has the first magnification in the third direction and the second magnification in the fourth direction. The light guide 30 according to Numerical Example 4 can be thinner than those of Numerical Examples 1 and 2.

In Numerical Example 4 as well, the propagation optical system 20 forms an intermediate image I within the light guide 30, which allows a thinner light guide 30 and guides the image light in the light guide 30 without total reflection. Further, the third face 340 of the light guide 30 has a negative power, enabling the suitable distance to the virtual image. Numerical Example 4 also satisfies all of the above conditional expressions (1) to (3) as described below.

Absolute value |RA|: 275.06 (see Formulae (1) and (2))
Absolute value |RA/RB|: 0.15 (see Formula (3))

In the virtual image display device 1A according to Numerical Example 4 as well, various aberrations are successfully corrected (see FIG. 15A and FIG. 15B), a wide angle of view (for example, an angle of view close to 40 degrees in a diagonal direction) is obtained, and desired image quality is achieved. The object distance changed by the negative power of the third face 340 is well corrected (see FIG. 18).

Numerical Example 5

Figure 19:
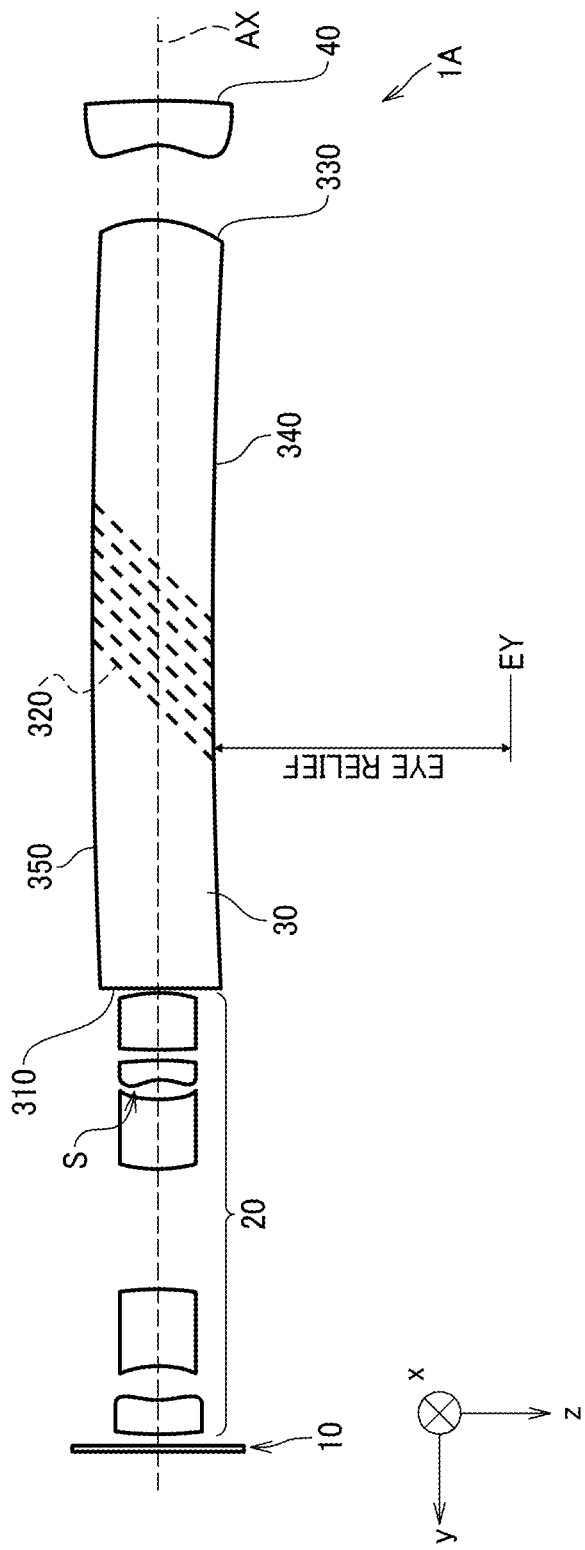
FIG. 19 is a diagram illustrating the optical configuration of a virtual image display device according to Numerical Example 5.

FIG. 19 is a diagram illustrating the optical configuration of a virtual image display device 1A according to Numerical Example 5.

FIG. 19 illustrates a yz cross-sectional plane of the virtual image display device 1A according to Numerical Example 5.

The virtual image display device 1A according to Numerical Example 5 has a similar configuration to that of the virtual image display device 1A according to Numerical Example 3 except for the surface shapes of the third face 340 and the opposing surface 350. In the following description of Numerical Example 5, the description of portions that overlap with those of Numerical Example 3 (e.g., the description of the xy cross-sectional view of the virtual image display device 1A) is omitted.

In Numerical Example 5, the angles of view of the virtual image in the vertical direction, the horizontal direction, and the diagonal direction are 20.5 degrees, 35.1 degrees, and 39.8 degrees, respectively. The light guide 30 has a thickness of 5 mm.

The distance to the virtual image is 1 m.

Table 9 presents a specific numerical configuration of the virtual image display device 1A according to Numerical Example 5.

TABLE 9

| | Rv | Rx | D | Nd | Vd | | |
|---|---|---|---|---|---|---|---|
| 0 | ∞ | ∞ | 0.00 | | | | |
| 1 | ∞ | ∞ | 0.30 | 1.51633 | 64.14 | | S-BSL7(OHARA) |
| 2 | ∞ | ∞ | 0.57 | | | | |
| 3** | 5.669 | −28.412 | 1.41 | 1.63200 | 23 | | OKP4HT(Osaka Gas Chemicals) |
| 4** | 2.799 | −23.894 | 1.41 | | | | |
| 5** | 18.62 | 34.564 | 3.41 | 1.53100 | 56 | | E48R(ZEON) |
| 6** | −21.411 | −7.546 | 5.36 | | | | |
| 7** | 6.228 | 5.854 | 3.00 | 1.53100 | 56 | | E48R(ZEON) |
| 8** | −65.103 | −15.859 | 0.00 | | | | |
| 9 | APERTURE STOP | | 0.76 | | | | |
| 10** | −3.086 | 112.703 | 0.90 | 1.63200 | 23 | | OKP4HT(Osaka Gas Chemicals) |
| 11** | −11.052 | 6.755 | 0.43 | | | | |
| 12** | 10.663 | 5.888 | 2.50 | 1.53100 | 56 | | E48R(ZEON) |
| 13** | −4.689 | −23.295 | 0.20 | | | | |
| 14 | ∞ | ∞ | 33.50 | 1.53100 | 56 | | E48R(ZEON) |
| 15** | −4.506 | −33.922 | 3.21 | | | | |
| 16** | −4.631 | −17.048 | 1.97 | 1.53100 | 56 | REFLECTION | E48R(ZEON) |
| 17** | −30.441 | −32.101 | −1.97 | 1.53100 | 56 | | E48R(ZEON) |
| 18** | −4.631 | −17.048 | −3.21 | | | | |
| 19** | −4.506 | −33.922 | A | 1.53100 | 56 | | E48R(ZEON) |
| 20 | ∞ | ∞ | 2.50 | 1.53100 | 56 | REFLECTION | E48R(ZEON) |
| 21* | 553.226 | | 15.000 | | | | |

Table 10 is a list of data on the aspherical surfaces in Numerical Example 5.

TABLE 10

| | CONIC COEFFICIENT | |
|---|---|---|
| | Kv | Kx |
| 3 | 0.000 | 0.000 |
| 4 | 0.000 | 0.000 |
| 5 | 0.000 | 0.000 |
| 6 | −127.395 | −11.481 |
| 7 | 1.658 | −0.086 |
| 8 | 0.000 | 0.000 |
| 10 | 0.000 | 0.000 |
| 11 | 0.000 | 0.000 |
| 12 | −5.225 | 0.799 |
| 13 | 0.000 | 0.000 |
| 15, 19 | −0.085 | −3.497 |
| 16, 17 | −0.358 | −0.266 |
| 18 | 0.000 | 0.000 |

| | SYMMETRY | | | |
|---|---|---|---|---|
| | $AR_4$ | $AR_6$ | $AR_8$ | $AR_{10}$ |
| 3 | −7.73123E−03 | −3.51289E−05 | 7.62856E−06 | 1.85801E−11 |
| 4 | −1.17866E−02 | 5.68737E−06 | −1.87692E−04 | 1.97018E−05 |
| 5 | −4.41413E−03 | −3.91897E−06 | −2.14961E−04 | −3.48629E−08 |
| 6 | −2.54578E−03 | 1.56024E−04 | −9.83271E−06 | 1.74249E−07 |
| 7 | 4.50406E−04 | −2.99426E−05 | −8.07497E−05 | 2.59875E−08 |
| 8 | −9.57945E−05 | 1.34175E−05 | 1.17411E−06 | 3.72008E−05 |
| 10 | −7.77583E−04 | −9.18008E−06 | 6.21665E−07 | 6.69977E−05 |
| 11 | 1.15037E−04 | −7.61688E−05 | −5.65925E−07 | −5.66392E−10 |
| 12 | −1.48320E−03 | −6.16248E−05 | −1.68368E−07 | −2.80790E−10 |
| 13 | 4.52251E−04 | 3.99524E−08 | 1.47564E−13 | −6.89083E−07 |
| 15.2 | −5.30808E−08 | 5.94093E−06 | 7.47250E−11 | 5.15744E−09 |
| 16.2 | −2.24024E−06 | 5.51073E−11 | −3.82564E−12 | 6.26365E−07 |
| 18 | −7.60837E−06 | −1.98635E−08 | 1.30622E−10 | −5.94934E−13 |

| | COEFFICIENT OF ASYMMETRY | | | |
|---|---|---|---|---|
| | $AP_4$ | $AP_6$ | $AP_8$ | $AP_{10}$ |
| 3 | 7.56652E−01 | −1.35523E+00 | −4.16576E−01 | −7.88735E+00 |
| 4 | 8.98361E−01 | 3.10836E+00 | 1.26448E+00 | 1.25338E+00 |
| 5 | 8.88786E−01 | 3.01173E+00 | 1.01602E+00 | −2.22718E−01 |
| 6 | −5.82259E−02 | −6.98181E−02 | 6.25123E−03 | 3.87566E−03 |
| 7 | 5.03527E−01 | 3.66392E−01 | 1.11608E+00 | −1.04231E−02 |
| 8 | −3.17812E−01 | 5.96345E−01 | 2.03828E+00 | 1.24013E+00 |
| 10 | −1.47707E−01 | −6.12941E−01 | 2.34992E+00 | 1.21051E+00 |
| 11 | −1.50323E−02 | 1.41096E+00 | 2.13194E+00 | 4.02155E+00 |
| 12 | 1.10849E−01 | 1.43285E+00 | 1.19221E+00 | 3.88434E+00 |
| 13 | 1.05405E−01 | −4.67819E+00 | 5.53378E+01 | 6.06683E−01 |
| 15, 19 | −1.48891E+01 | 9.68270E−01 | −2.97324E−01 | 1.12989E+05 |
| 16, 17 | −2.36621E+00 | 1.35375E+01 | 1.67175E+00 | 1.03072E+00 |
| 18 | 1.90536E−01 | −1.62582E−02 | −6.21050E−02 | 1.04507E−01 |

| | K | A4 | A6 | A8 | A10 |
|---|---|---|---|---|---|
| 21 | 0 | −1.25742E−06 | 7.00664E−09 | −2.10018E−11 | 2.38050E−14 |

Table 11 presents data on the surface shape of the opposing surface 350 of the light guide 30 according to Numerical Example 5.

TABLE 11

| | SHAPE OF OPPOSED | | | | | |
|---|---|---|---|---|---|---|
| | R | K | A4 | A6 | A8 | A10 |
| EXAMPLE 5 | 894.762 | 0.000 | 0.00000E+00 | 0.00000E+00 | 0.00000E+00 | 0.00000E+00 |

FIGS. 20A and 20B illustrate lateral aberration diagrams when image light from the image display element 10 passes through the optical system for the virtual image display device (the propagation optical system 20, the light guide 30, and the reflector 40) according to Numerical Example 5 of the present disclosure.

FIG. 21 illustrates lateral aberration diagrams when light from an object at infinity passes through the light guide 30 according to Numerical Example 5 of the present disclosure.

In Numerical Example 5 as well, an intermediate image I is formed within the light guide 30 using an anamorphic power. The intermediate image I has the first magnification in the third direction and the second magnification in the fourth direction. The light guide 30 according to Numerical Example 4 can be thinner than those of Numerical Examples 1 and 2.

In Numerical Example 5 as well, the propagation optical system 20 forms an intermediate image I within the light guide 30, which allows a thinner light guide 30 and guides the image light in the light guide 30 without total reflection. Further, the third face 340 of the light guide 30 has a negative power, enabling the suitable distance to the virtual image. Numerical Example 5 also satisfies all of the above conditional expressions (1) to (3) as described below.

Absolute value |RA|: 553.23 (see Formulae (1) and (2))
Absolute value |RA/RB|: 0.62 (see Formula (3))

In the virtual image display device 1A according to Numerical Example 5 as well, various aberrations are successfully corrected (see FIG. 20A and FIG. 20B), a wide angle of view (for example, an angle of view close to 40 degrees in a diagonal direction) is obtained, and desired image quality is achieved. The object distance changed by the negative power of the third face 340 is well corrected (see FIG. 21).

The above is a description of embodiments of the present disclosure. The embodiments of the present invention are not limited to those described above, and various modifications are possible within the scope of the technical idea of the present invention. For example, the embodiments of the present application also include contents obtained by appropriately combining the embodiments explicitly described in the specification or the obvious embodiments.

As described below, the virtual image display device 1A according to the present embodiment is applicable to various uses.

For example, the virtual image display device 1A can be used as glasses in an educational environment. The glasses can display electronic learning content such as what is seen in textbooks. Using the glasses, the user can view, obtain, and review items to be tested.

In embodiments, the user can be monitored while taking the test. The glasses can measure the user's time during the navigation through the study materials, track the user's responses, and adjust the test as needed based on the user's answers and/or the progress of the exam.

In another embodiment, the user may view an augmented reality (AR) overlays through the glasses.

In embodiments, the AR overlays may include step-by-step guidance for practical courses and lectures.

In embodiments, the virtual image display device 1A displays a virtual professor and enables interaction through video, audio, and chat.

The glasses allow the user to view a blackboard or whiteboard and input additional items on the board. The glasses further allow the user to share the input items with other users who can view the blackboard or whiteboard on the user interface. Additionally, the glasses allow the user to add and/or overlay the actual board such as an AR notes when viewing a specific blackboard or whiteboard as a display.

In embodiments, the glasses provide a social network platform for members of a class or educational sector and also offer social network content for or related to members of the class.

In embodiments, the glasses can be used for commercial transactions in educational environments.

For example, the glasses allow the user to purchase a program or track the progress of content and units of a subject in other ways.

In addition, the glasses allow the user to monitor the levels of exams and quizzes as well as the implementation dates of upcoming exams and quizzes. The glasses allow the user to download information on course credits and degrees. The glasses allow the user to incorporate learning tasks discussed in a class or listed in a syllabus and add them to the schedule. The user can meet by communicating with friends or class members through the glasses.

In embodiments, the glasses allow the user to view and track the invoice and course details for review.

In embodiments, the glasses allow the user to purchase and run the program or use the program. The program provides advertisements in association with the program.

In a further embodiment, the glasses allow the user to use the glasses in an educational environment.

The glasses allow the user to scan the answer sheets for exams or quizzes and view, operate, or perform other actions through the glasses. The glasses allow the user to scan or capture data related to the contents of textbooks, manuals, and/or test papers, as well as blackboard/whiteboard content to take notes and track assignments. The glasses allow the can to read or capture data related to posters/signs. Thus, the glasses allow the user to track upcoming student meetings, descriptions for constructing survey forms, and meeting locations.

In embodiments, the glasses allow the user to photograph the faces of classmates, friends, participants, and others.

In embodiments, the glasses enable tracking of the user's eye movements to verify interaction with content.

In embodiments, the glasses can be compatible with the LIFESTRIDE or other pen functions for capturing contents. In response to the user gesturing towards a note and moving a pen that is in communication with the glasses, the glasses can store the user's notes.

In other embodiments, in response to the user's gesture, the glasses can record notes based on that gesture. In still other embodiments, another sensor associated with the user's hand allows the glasses to record a note when the user makes a note.

In embodiments, the system may incorporate an interactive head-mounted eyepiece worn by the user.

This type of eyepiece includes a module that determines whether the eyepiece is near an educational environment.

The system further includes an optical assembly through which the user views the surrounding environment, a processing module that recognizes features of the environment and renders educational content associated with the environment, an image processing module that captures and processes images of the surrounding environment of the wearer of the head-mounted eyepiece. The image processing module can overlay display elements on recognized features of the surrounding environment. The system further includes an integrated image light source that introduces content into the optical assembly.

The integrated image light source renders the education-related content as an overlay on the environment. The content may be presented in the display in relation to the recognized feature.

In embodiments, the integrated image light source may provide a display of transportation-related content pertaining to the transport environment, and such a relationship with the recognized feature may not exist.

In embodiments, the rendering of the educational content may occur as a result of reading barcodes, and QR Codes™, inputting an image of a textbook within the eyepiece, inputting an image of distributed materials within the eyepiece, recognizing a marker within the environment, or entering a location within the educational environment.

In embodiments, the educational environment may be a classroom, exercise studio, automobile service station, garage, outdoor environment, gymnasiums, laboratories, factories, offices, kitchens, or hospitals.

Further, the instructional content can be text, textbook excerpts, instructions, video, audio, practice plans, chemical structures, 3D images, 3D overlays, text overlays, classrooms, problem sheets, tests, recipes, lesson notes, medical charts, customer files, safety precautions, or practice procedures.

In embodiments, educational content may be associated with or overlaid on an object within the environment.

In embodiments, the object is a whiteboard, blackboard, machine, automobile, aircraft, patient, textbook, or projector, for example.

In embodiments, the system may be used for social networking and may further employ facial recognition of at least one of classmates and teachers in the environment.

In embodiments, the glasses allow the user to send and receive friend requests by making gestures with a part of the body.

In embodiments, the glasses allow the user to interact with content to take a test, complete assignments, view a syllabus, view class schedules, practice techniques, track course progress, monitor student units, take notes, record a note, and submit questions.

In embodiments, content can be presented as an overlay on or near a recognized feature.

Further, the recognized feature may be at least one of a poster, a blackboard, a whiteboard, a screen, a machine, an automobile, an aircraft, a patient, a textbook, a projector, a monitor, a desk, and a smart board.

For example, a note may be displayed on a display framed by a blackboard, a video may be displayed in a specific area on the display screen, and molecular representations may be overlaid onto the blackboard.

In embodiments, recognizing the feature may include at least one of the following: automatically processing an image including the feature, signaling the feature, communicating with the feature, recognizing the feature by processing the location of the feature, obtaining information about the feature by processing the location of the feature, retrieving information about the feature from a database, and specifying the feature by a user.

In addition, the glasses allow the user to specify the function to retain overlay content by interacting with the user interface of the eyepiece.

A case in which the virtual image display device 1A is used as a head-mounted display for surgical operation is described below.

Figure 22:
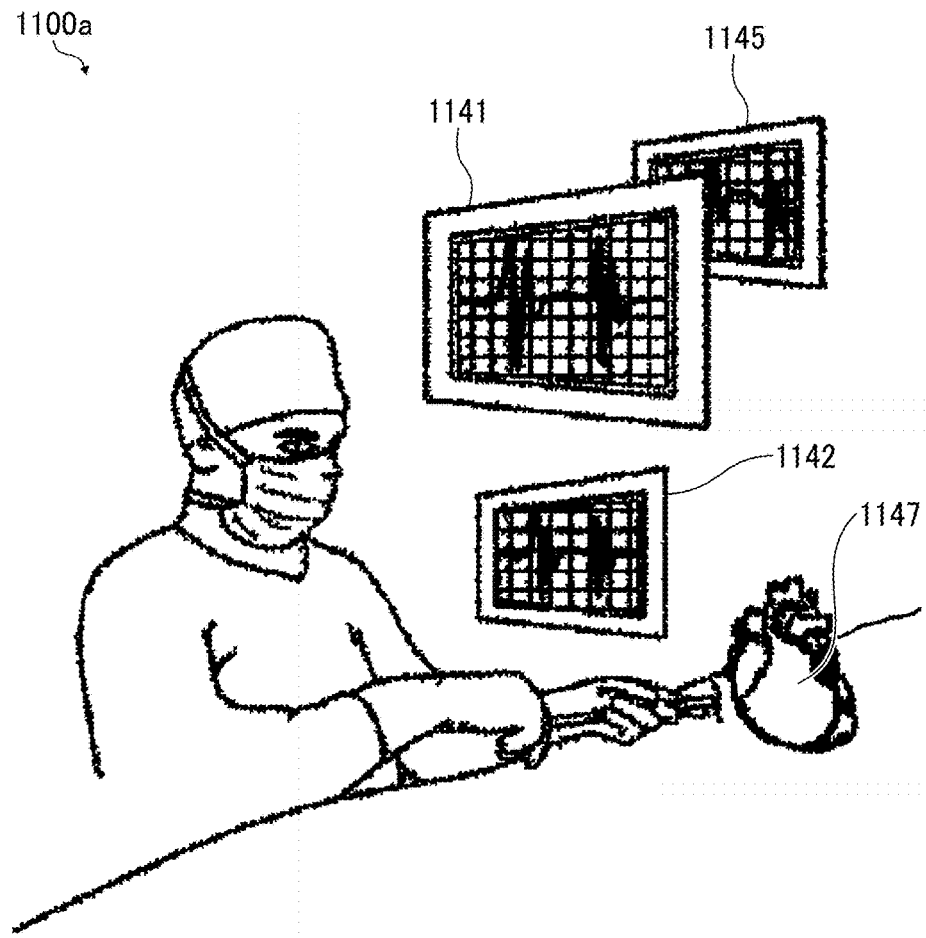
FIG. 22 is a diagram of muting a head-mounted display in a surgical context according to an embodiment.
Figure 23:
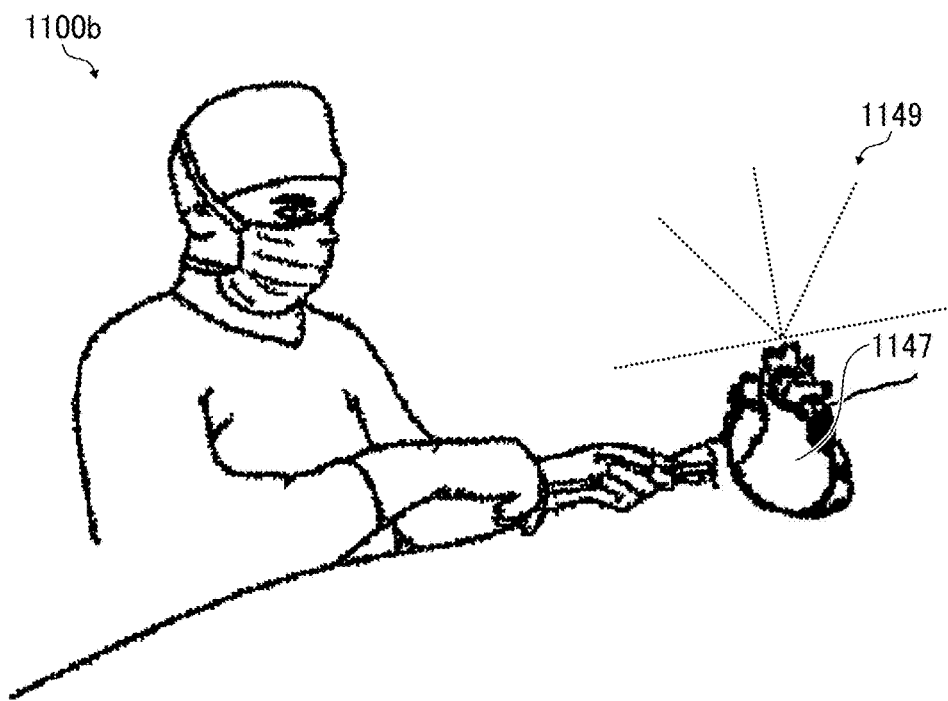
FIG. 23 is a diagram of muting a head-mounted display in a surgical context according to an embodiment.

FIGS. 22 and 23 are diagrams of muting a head-mounted display in a surgical context according to an embodiment. FIGS. 22 and 23 illustrate surgical scenes 1100*a* and 1100*b*, respectively.

In FIG. 22, a surgeon is performing a surgical procedure on a heart 1147. The surgeon may wear a head-mounted display.

The surgeon can perceive the heart 1147 within its field of view (FOV). The surgeon can also perceive virtual objects 1141, 1142, and 1145 within the FOV.

The virtual objects 1141, 1142, and 1145 may be related to various metrics (e.g., heart rates and an electrocardiogram (ECG)) and diagnostics (e.g., arrhythmia and cardiac arrest) associated with the heart 1147.

The head-mounted display can present the virtual objects 1141, 1142, and 1145 based on information obtained by an environmental sensor of the wearable system or by communicating with another device or a remote processing module of the wearable system.

During surgical procedures, unexpected or emergency situations may occur. For example, sudden undesired blood flow at the surgical site can be observed, as indicated by blood spatter 1149 from the heart 1147 (see FIG. 23).

The wearable system may use computer vision techniques to detect such a current situation, for example, by detecting rapidly occurring changes in feature points or features within or near the surgical site, for example, within images captured by an outward-facing camera.

The wearable system may also perform such detection based on data received from another device or a remote processing module.

The wearable system may determine that the current situation meets the criterion for a trigger event where the display of visual or audible virtual content should be muted, so that the surgeon may direct attention to an unexpected or emergency situation. The wearable system may automatically mute the virtual content in response to the automatic detection of a trigger event (e.g., the blood spatter 1149 as illustrated in FIG. 23). As a result, in FIG. 23, the surgeon is not presented with virtual objects 1141, 1142, and 1145 by the head-mounted display, allowing the surgeon to direct all his/her attention to stopping the blood spurt.

In response to the termination event, the head-mounted display can resume its standard operation and restore the presentation of the virtual content to the surgeon.

The termination event may be detected when the trigger event ends (for example, when the blood spatter 1149 stops) or when the user enters a different environment where the trigger event does not exist (for example, when the user exits the emergency room).

The termination event can also be based on a threshold time period.

For example, the head-mounted display may resume its standard operation in response to detecting the trigger event, after a period of time has elapsed (e.g., 5 minutes, 15 minutes, 1 hour, etc.), or in response to detecting that the trigger event has ended for that period of time. The head-mounted display may resume its standard operation after a certain time period has elapsed (for example, five minutes, 15 minutes, or one hour) in response to the detection of a trigger event, or upon detecting that the trigger event has ended over that time period. For example, the wearable system may resume the display (or other component of the wearable system) before the trigger event ends.

The following describes a use case in which the virtual image display device 1A is used as a cooking head-mounted display according to an embodiment of the present disclosure. In this use case, the head-mounted display is mounted with a camera unit.

Figure 24:
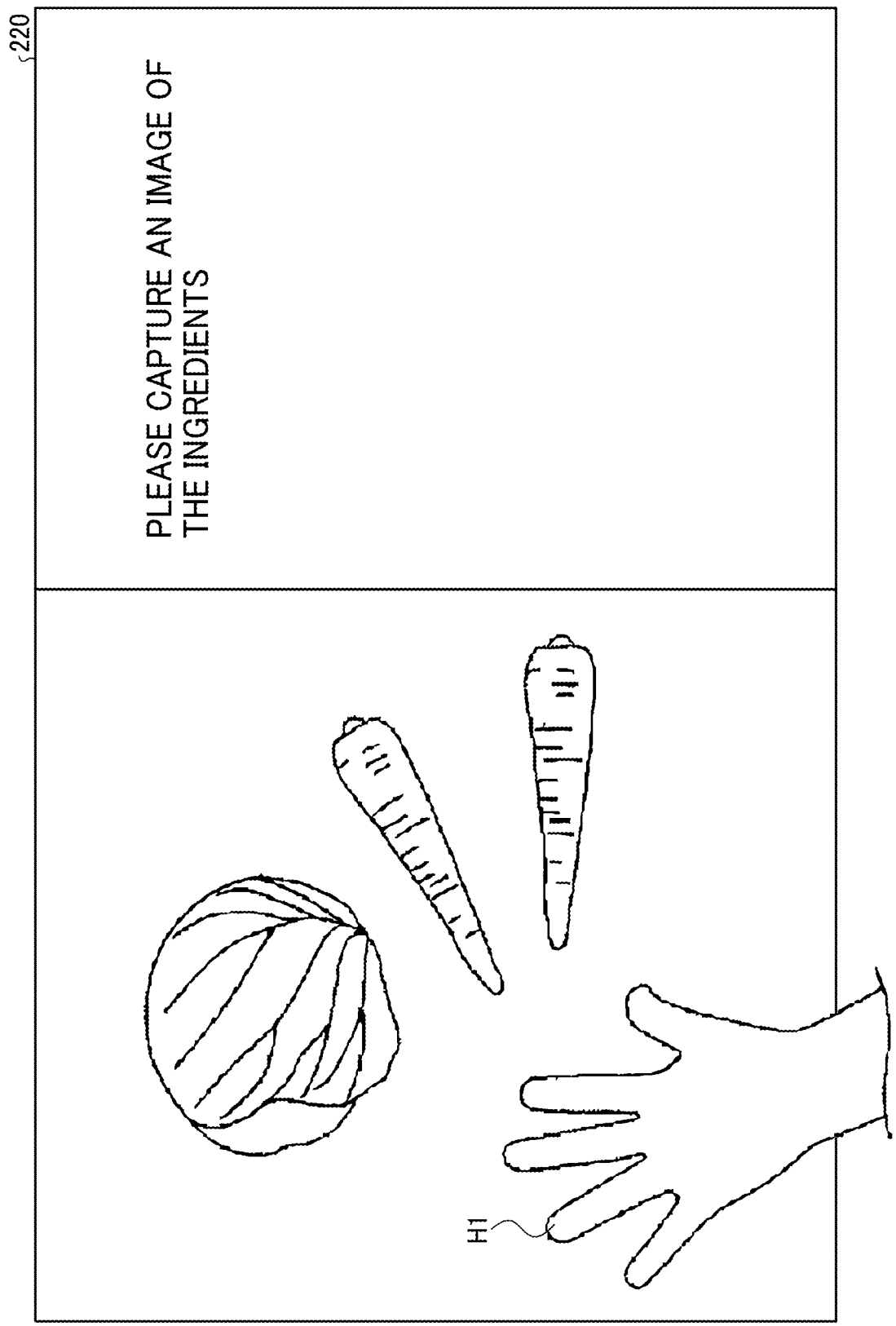
FIG. 24 is a schematic diagram of a display of a semi-transparent display according to an embodiment of the present disclosure.
Figure 25:
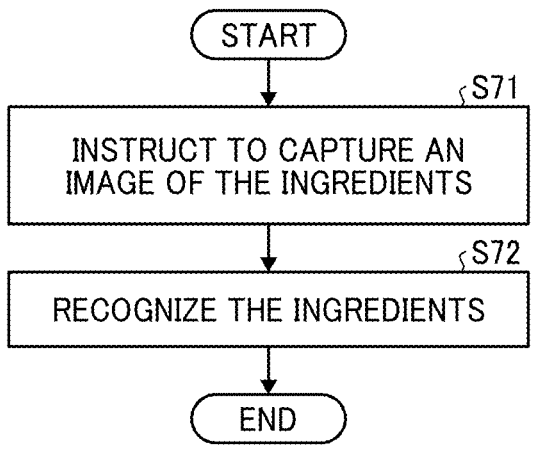
FIG. 25 is a flowchart of processing performed by a control unit of a cooking head-mounted display according to an embodiment of the present disclosure.
Figure 26:
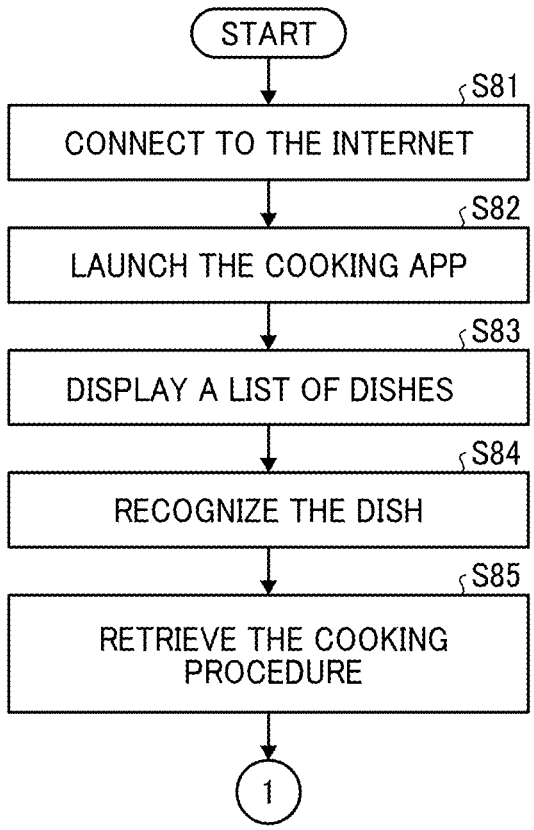
FIG. 26 is a flowchart of processing performed by the control unit of the cooking head-mounted display according to an embodiment of the present disclosure.
Figure 27:
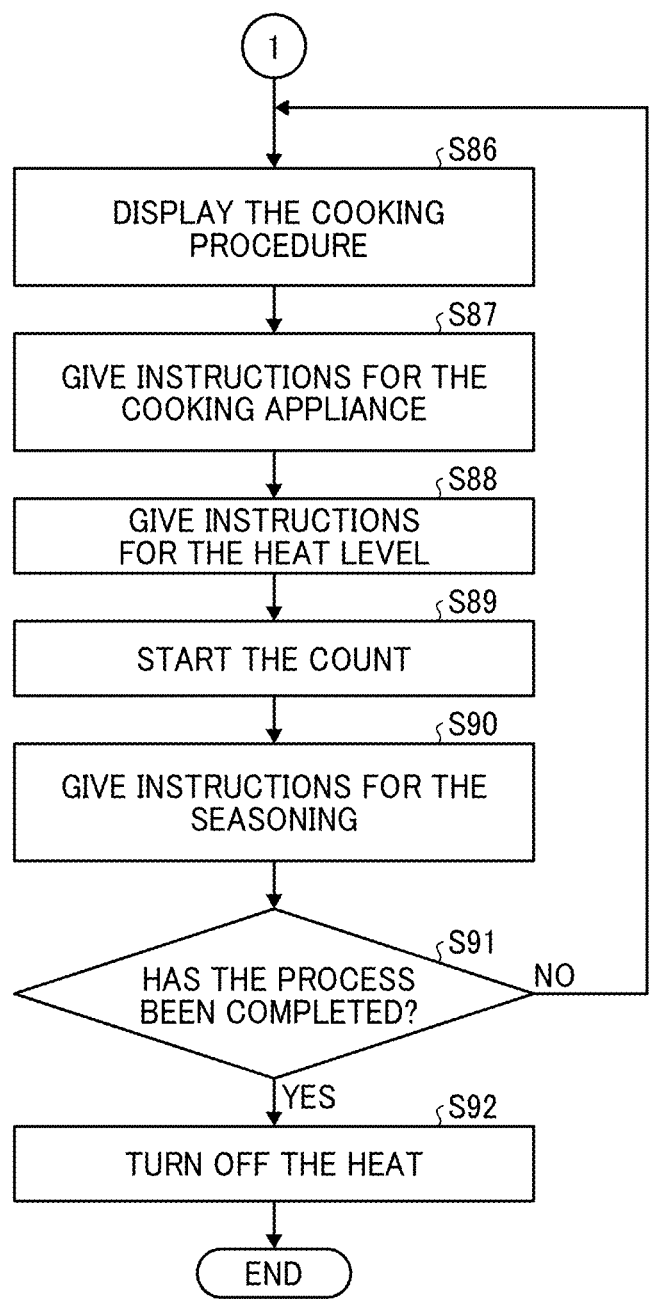
FIG. 27 is a flowchart of processing performed by the control unit of the cooking head-mounted display according to an embodiment of the present disclosure.

FIG. 24 is a schematic diagram of a field of view 220 viewed through the head-mounted display according to an embodiment of the present disclosure. FIGS. 25 to 27 are flowcharts of the processing of the head-mounted display according to an embodiment of the present disclosure.

As represented in FIG. 25, the head-mounted display displays an ingredient in the field of view 220 to capture an image of the ingredient (step S71). When capturing the image of the ingredient, there is no need for the user to press the shutter of the camera unit. The camera unit automatically recognizes the ingredient by, for example, its shape and color.

In the present embodiment, the camera unit is assumed to capture the images of the ingredients. In another embodiment, the head-mounted display reads the barcode displayed on the ingredient or reads a receipt after shopping. In a case where the refrigerator itself or the storage cabinet itself has information about its contents, the head-mounted display acquires that information using a communication system.

In response to the ingredient being captured, the head-mounted display recognizes the ingredient (step S72).

As represented in FIG. 26, the head-mounted display connects to the Internet using the communication system (step S81).

In response to the user's selection of the colling application software displayed in the field of view 220, through hand recognition with a hand H1, the head-mounted display launches the cooking application (step S82).

Subsequently, the head-mounted display displays a list of dishes that can be prepared with ingredients (step S83).

Figure 28:
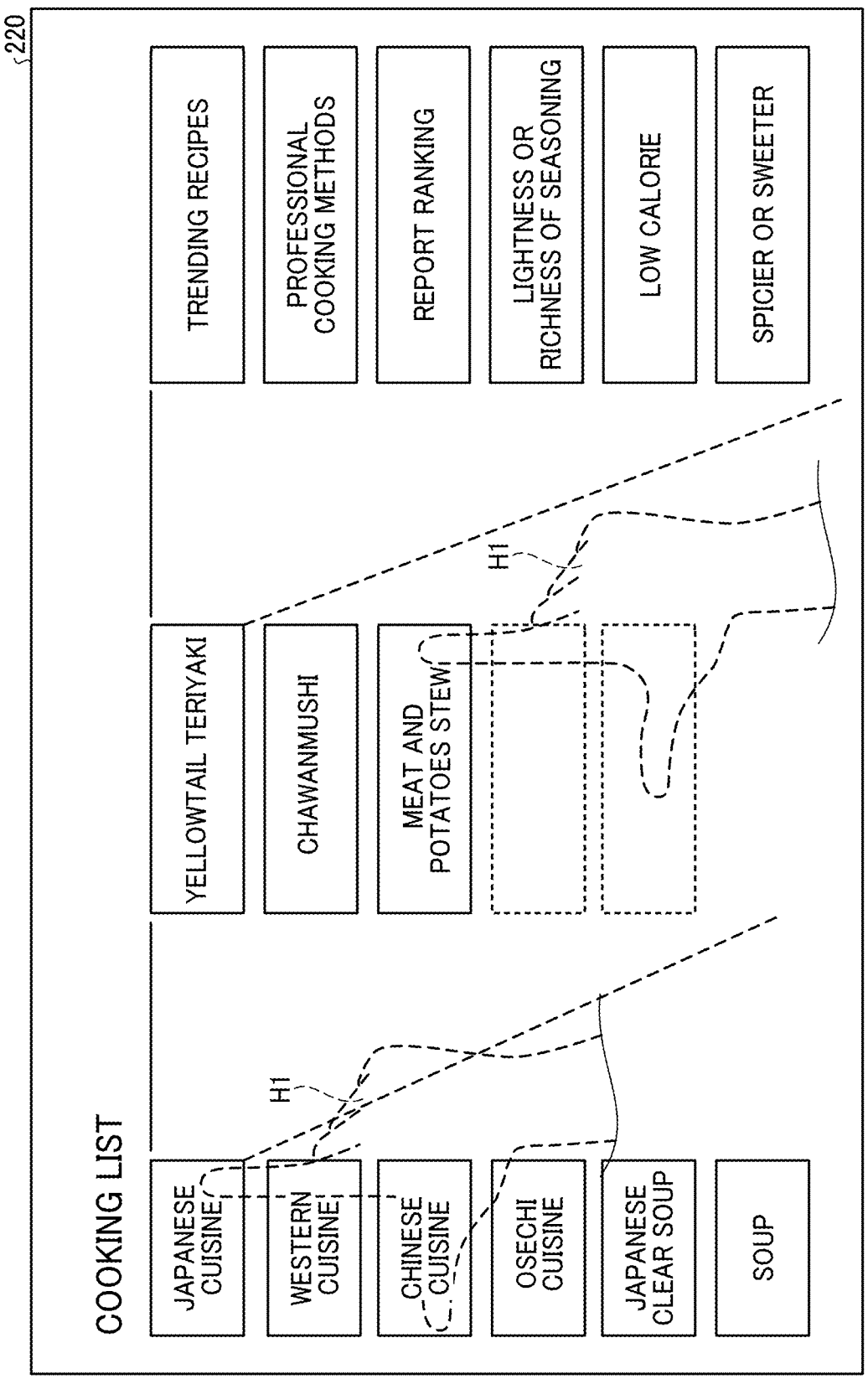
FIG. 28 is a schematic diagram of a list of dishes that can be cooked with ingredients by the control unit.

FIG. 28 is a schematic diagram of the list of dishes that can be prepared with ingredients according to an embodiment of the present disclosure. As illustrated in FIG. 28, the head-mounted display displays major categories such as "JAPANESE CUISINE", "WESTERN CUISINE", "CHINESE CUISINE", "OSECHI CUISINE", "JAPANESE CLEAR SOUP", and "SOUP" in the field of view 220. For example, the head-mounted display displays subcategories such as "YELLOWTAIL TERIYAKI", "CHAWAN-MUSHI", and "MEAT AND POTATOES STEW" in response to the selection of "JAPANESE CUISINE". For example, in response to the selection of "MEAT AND POTATOES STEW", the head-mounted display displays segments such as "TRENDING RECIPES", "PROFESSIONAL COOKING METHODS", "REPORT RANKING", "LIGHTNESS OR RICHNESS OF SEASONING", "LOW CALORIE", and "SPICIER OR SWEETER". In some embodiments, the head-mounted display displays a list for children.

As presented in FIG. 26, the head-mounted display recognizes the selected dish (step S84) and retrieves a cooking procedure of the dish (step S85).

In some embodiments, the head-mounted display may acquire the cooking procedure from the Internet using a communication system. Alternatively, the head-mounted display acquires the cooking procedure by reading from the storage unit inside the head-mounted display.

As presented in FIG. 27, the head-mounted display displays the cooking procedure in the field of view 220 and gives cooking instructions for ingredients (step S86).

Figure 29:
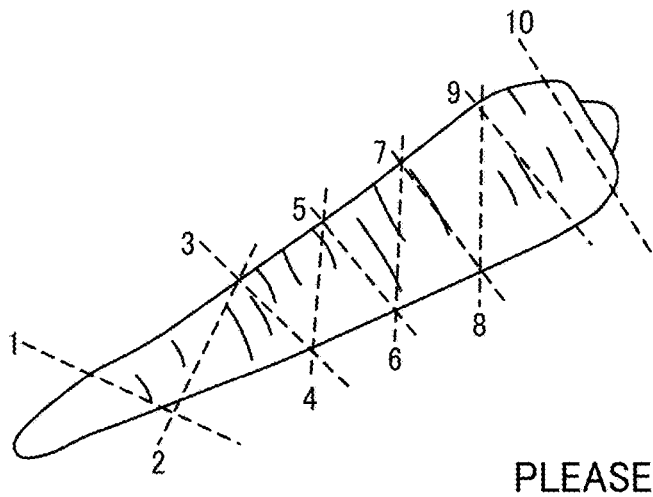
FIG. 29 is a schematic diagram of a display of the semi-transparent display according to an embodiment of the present disclosure.

FIG. 29 is a schematic diagram illustrating the display of the field of view 220 according to an embodiment of the present disclosure.

FIG. 29 illustrates, for example, how to cut the carrot. More specifically, the head-mounted display recognizes the outer shape of the carrot and indicates the positions to cut the carrot with a knife. This allows the user to cut the carrot into an optimal size by following the instructions.

Subsequently, the head-mounted display displays instructions for the cooking appliance in the field of view 220 (step S87) and gives heat level instructions for the heating cooker (step S88).

Figure 30:
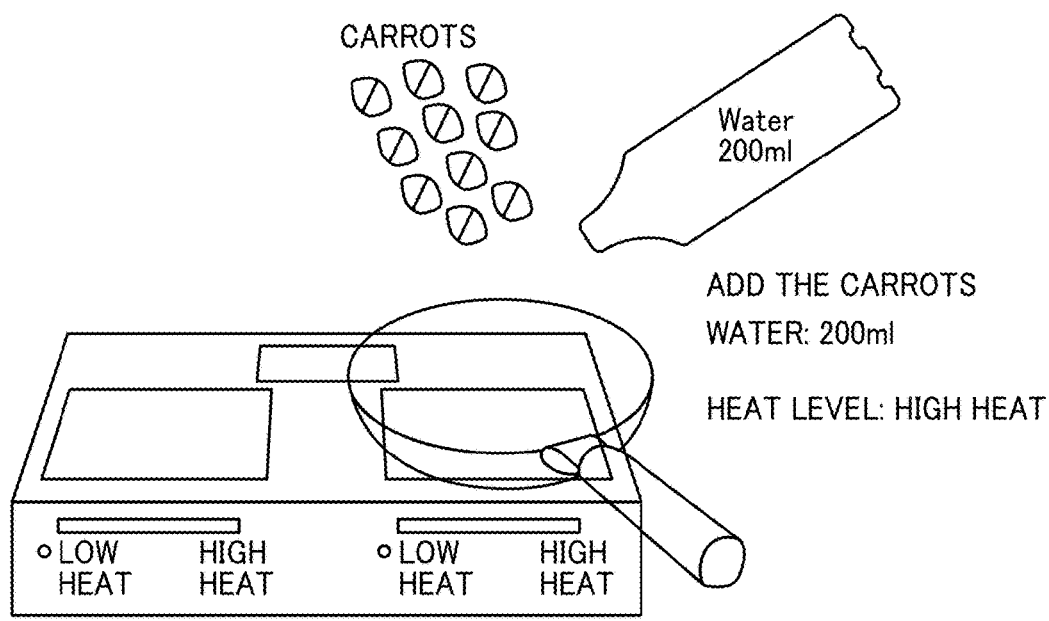
FIG. 30 is a schematic diagram of a display of the semi-transparent display according to an embodiment of the present disclosure.

FIG. 30 is a schematic diagram illustrating the display of the field of view 220 according to an embodiment of the present disclosure. As illustrated in FIG. 30, the head-mounted display displays, in the field of view 220, instructions to put ingredients into a pot, put water into the pot, and set the heating power of the induction heating (IH) cooker to "HIGH HEAT", "MEDIUM HEAT", or "LOW HEAT" (i.e., the head-mounted display gives instructions for the heat level in step S88).

The head-mounted display starts counting from the time the heating began, using the internal clock (step S89). Based on the counted time, the head-mounted display determines the timing for an action such as adding the next ingredient or adding seasoning.

Subsequently, the head-mounted display displays, in the field of view 220, instructions for the type and amount of seasoning when adding seasoning, according to the cooking procedure (step S90).

Figure 31:
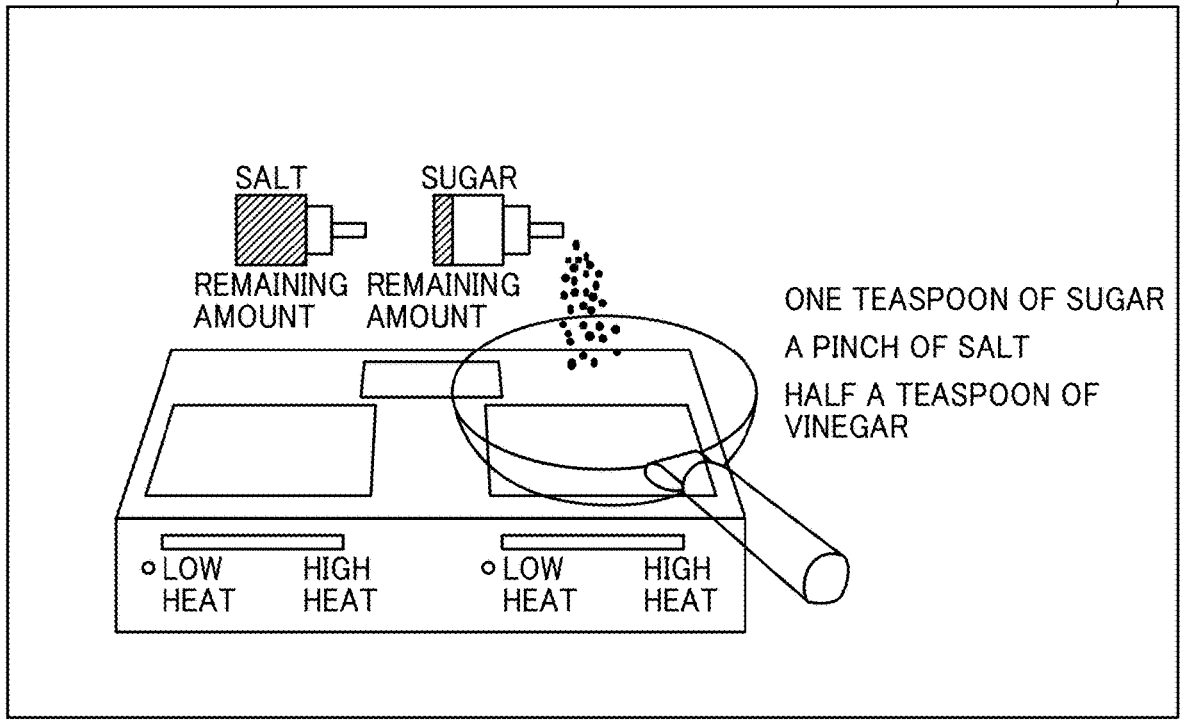
FIG. 31 is a schematic diagram of a display of the semi-transparent display according to an embodiment of the present disclosure.
Figure 32:
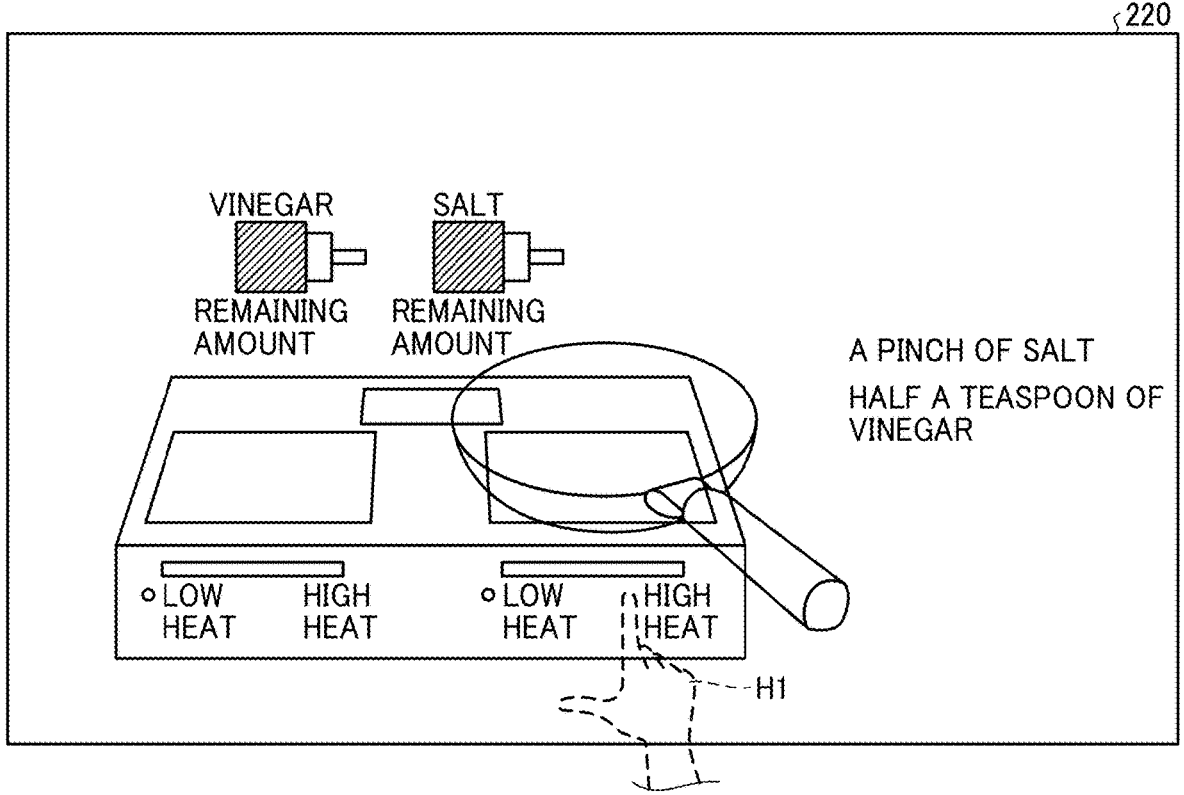
FIG. 32 is a schematic diagram of a display of the semi-transparent display according to an embodiment of the present disclosure.

FIGS. 31 and 32 are schematic diagrams each illustrating the display of the field of view 220 according to an embodiment of the present disclosure.

In FIG. 31, the head-mounted display instructs, in the field of view 220, to add seasonings in the order of sugar followed by salt. This allows the user to add the seasonings in this order.

The head-mounted display recognizes the amount of sugar being poured from the sugar container through the camera unit, and displays the remaining amount needed to add a teaspoon of sugar in the field of view 220 as illustrated in FIG. 31. This allows the user to check the display of the field of view 220 and add sugar.

Upon determining that the predetermined amount of sugar has been added, the head-mounted display removes the display of sugar from the field of view 220 and displays the salt container as illustrated in FIG. 32. As illustrated in FIG. 32, for example, in response to a gesture given by hand H1 to adjust the heat, the communication system may send instructions to the heating device, allowing for adjustment such as reducing the heat. This eliminates the need for the user to, for example, run from the refrigerator to the heat device. In some embodiments, the heating power may only be reduced for safety.

The head-mounted display determines whether the cooking procedure has been completed or not (step S91).

Based on a determination that the cooking procedure has not been completed (NO in Step S91), the head-mounted display returns to step S86 to repeat the process, for example, when another ingredient is still left to be cooked.

Based on a determination that the cooking procedure has been completed (YES in Step S91), the head-mounted display checks whether the IH cooker or other appliances have been set to "OFF" (step S92) and ends the process.

In the present embodiment, the process ends when the cooking is completed. However, in another embodiment, the head-mounted display gives instructions for a subsequent step (e.g., plating). Cooking using the head-mounted display may be carried out not only for single type of dish but also for, for example, multiple types of dishes in parallel. The order of dishes to be cooked may be rearranged according to the type of cooking such as cutting, baking, or boiling. Since food cooked by boiling or stewing takes time, food cooked by boiling or stewing may be ordered first.

As described above, the head-mounted display allows for the displaying of multiple pieces of cooking information in the field of view 220. This allows the user to select one piece of cooking information from the displayed multiple pieces of cooking information by hand H1.

The cooking information includes, for example, at least cooking procedure information, cooking ingredient information, cooking seasoning information, and cooking temperature information. The head-mounted display allows the user to cook without referring to a cookbook, allowing for smoother cooking. The head-mounted display also allows the user to easily check cooking information regardless of, for example, whether the hand is wet or covered in powder. The cooking ingredient information includes at least the size of the completed dish and its quantity, and the timing at which the ingredient is put into the cooking appliance. The cooking seasoning information includes at least the amount of the seasoning and the timing of adding the seasoning into the cooking appliance.

The following describes aspects of the present disclosure.

Aspect 1

An optical system for a virtual image display device includes: a light guide to guide image light emitted from an image display element that displays an image; a partial reflector; and a reflector. The partial reflector transmits a first image light guided in a first direction from a first side of the partial reflector in a light guide; and reflects second image light to exit outside the light guide from a light emission surface of the light guide. The second image light is guided in the light guide in a second direction, different from the first direction, from a second side different from (e.g., opposite to) the first side of the partial reflector. The reflector is at the second side of the partial reflector and reflects the first image light transmitted through the partial reflector in the first direction, back to the partial reflector as the second image light in the second direction. A dimension of the light guide in a thickness direction is longer than a beam diameter of the image light guided in the light guide, the thickness direction being defined by a distance between the light emission surface and an opposing surface of the light guide opposed to the light emission surface. The light emission surface has a negative power.

Aspect 2

In the optical system according to Aspect 1, the light emission surface of the light guide has a concave surface.

Aspect 3

In the optical system according to Aspect 1 or 2, the reflector converts the first image light into collimated light and reflects the collimated light as the second image light back to the partial reflector.

Aspect 4

The optical system according to any one of Aspects 1 to 3, further includes a propagation optical system to: transmit the image light emitted from the image display element to the light guide; and form an intermediate image of the image light within the light guide.

Aspect 5

The optical system according to Aspect 4, further includes an aperture stop on an optical path between the image display element and the partial reflector.

Aspect 6

In the optical system according to Aspect 4 or 5, the propagation optical system includes an anamorphic surface having: a first magnification in a third direction different from the first direction and the second direction and parallel to the thickness direction; and a second magnification, different from the first magnification, in a fourth direction different from the first direction, the second direction, and the third direction. The propagation optical system forms an intermediate image of the image light within the light guide, the intermediate image having: the first magnification in the third direction; and the second magnification in the fourth direction.

Aspect 7

In the optical system according to any one of Aspects 1 to 6, the optical system satisfies a formula:

$$100 < |RA| < 2000$$

where

RA is a paraxial radius of curvature (mm) of the light emission surface.

Aspect 8

In the optical system according to any one of Aspects 1 to 7, the opposing surface of the light guide opposed to the light emission surface has a positive power.

Aspect 9

In the optical system according to any one of Aspects 1 to 8, the optical system satisfies a formula:

$$0.0 < |RA/RB| < 1.1$$

where

RA is a paraxial radius of curvature (mm) of the light emission surface; and

RB is a paraxial radius of curvature (mm) of the opposing surface.

Aspect 10

The optical system according to any one of Aspects 1 to 9, further includes multiple partial reflectors including the partial reflector. The multiple partial reflectors are spaced apart from each other in the optical axis direction.

Aspect 11

A virtual image display device includes: the optical system according to any one of Aspects 1 to 10; and the image display element.

Aspect 12

A head-mounted display comprising the virtual image display device according to Aspect 11.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An optical system comprising:
a light guide to guide image light emitted from an image display element that displays an image;
a partial reflector to:
transmit a first image light guided in a first direction from a first side of the partial reflector in a light guide; and
reflect second image light to exit outside the light guide from a light emission surface of the light guide, the second image light guided in the light guide in a second direction opposite to the first direction from a second side different from the first side of the partial reflector; and a reflector at the second side of the partial reflector to reflect the first image light, transmitted through the partial reflector in the first direction, back to the partial reflector as the second image light in the second direction, wherein a dimension of the light guide in a thickness direction is longer than a beam diameter of the image light guided in the light guide, the thickness direction being defined by a distance between the light emission surface and an opposing surface of the light guide opposed to the light emission surface, and the light emission surface has a negative power.

2. The optical system according to claim 1, wherein the light emission surface of the light guide has a concave surface.

3. The optical system according to claim 1, wherein the reflector:

converts the first image light into collimated light; and reflects the collimated light as the second image light back to the partial reflector.

4. The optical system according to claim 1, further comprising a propagation optical system to:

transmit the image light emitted from the image display element to the light guide; and form an intermediate image of the image light within the light guide.

5. The optical system according to claim 4, further comprising an aperture stop on an optical path between the image display element and the partial reflector.

6. The optical system according to claim 4, wherein the propagation optical system includes an anamorphic surface having:

a first magnification in a third direction different from the first direction and the second direction and parallel to the thickness direction; and a second magnification, different from the first magnification, in a fourth direction different from the first direction, the second direction, and the third direction, and the propagation optical system forms an intermediate image of the image light within the light guide, the intermediate image having:

the first magnification in the third direction; and the second magnification in the fourth direction.

7. The optical system according to claim 1, wherein the optical system satisfies a formula:

$$100<|RA|<2000$$

where

RA is a paraxial radius of curvature (mm) of the light emission surface.

8. The optical system according to claim 1, wherein the opposing surface of the light guide has a positive power.

9. The optical system according to claim 8, wherein the optical system satisfies a formula:

$$0.0<|RA/RB|<1.1$$

where

RA is a paraxial radius of curvature (mm) of the light emission surface; and

RB is a paraxial radius of curvature (mm) of the opposing surface.

10. The optical system according to claim 1, further comprising multiple partial reflectors including the partial reflector, wherein the multiple partial reflectors are spaced apart from each other in an optical axis direction.

11. A virtual image display device comprising:

the optical system according to claim 1; and the image display element.

12. A head-mounted display comprising the virtual image display device according to claim 11.

* * * * *